(12) United States Patent
Felthouse et al.

(10) Patent No.: US 7,740,827 B2
(45) Date of Patent: Jun. 22, 2010

(54) RUTHENIUM OXIDE CATALYSTS FOR CONVERSION OF SULFUR DIOXIDE TO SULFUR TRIOXIDE

(75) Inventors: Timothy R. Felthouse, Wildwood, MO (US); Abraham Bino, Jerusalem, IL (US)

(73) Assignee: MECS, Inc., St. Louis, MO (US)

( * ) Notice: Subject to any disclaimer, the term of this patent is extended or adjusted under 35 U.S.C. 154(b) by 84 days.

(21) Appl. No.: 12/067,660

(22) PCT Filed: Sep. 25, 2006

(86) PCT No.: PCT/US2006/037357

§ 371 (c)(1),
(2), (4) Date: Mar. 21, 2008

(87) PCT Pub. No.: WO2007/035949

PCT Pub. Date: Mar. 29, 2007

(65) Prior Publication Data

US 2008/0226540 A1 Sep. 18, 2008

Related U.S. Application Data

(60) Provisional application No. 60/720,221, filed on Sep. 23, 2005.

(51) Int. Cl.
*B01J 23/36* (2006.01)
*B01J 37/00* (2006.01)
*C01B 17/74* (2006.01)
*C01B 17/78* (2006.01)

(52) U.S. Cl. .................. 423/522; 423/532; 423/533; 423/538; 502/325; 502/349; 502/304; 502/300; 502/355; 502/439

(58) Field of Classification Search ................. 423/522, 423/532, 533, 538; 502/325, 349, 304, 300, 502/302, 355, 439
See application file for complete search history.

(56) References Cited

U.S. PATENT DOCUMENTS 2,742,437 A 4/1956 Houdry et al.

(Continued)

FOREIGN PATENT DOCUMENTS

AT 402286 B 8/1986

(Continued)

OTHER PUBLICATIONS

Echigo, et al., "Development of Residential PEFC Cogeneration Systems: Ru Catalyst for CO preferential Oxidation in Reformed Gas," 2003, Catalysis Today, 84:209-215.

(Continued)

*Primary Examiner*—Timothy C Vanoy
(74) *Attorney, Agent, or Firm*—Senniger Powers LLP

(57) ABSTRACT

The present invention relates generally to catalysts comprising ruthenium oxide and to processes for catalyzing the oxidation and conversion of sulfur dioxide ($SO_2$) to sulfur trioxide ($SO_3$) using such catalysts. $SO_2$ at low concentrations in process gas streams can be effectively oxidized to $SO_3$ at relatively low temperatures using the ruthenium oxide catalysts of the present invention. In one application, the ruthenium oxide catalysts are used in the final contact stage for conversion of $SO_2$ to $SO_3$ in multiple stage catalytic converters used in sulfuric acid manufacture.

38 Claims, 12 Drawing Sheets

U.S. PATENT DOCUMENTS

| | | | |
|---|---|---|---|
| 3,554,929 | A | 1/1971 | Aarons |
| 3,692,810 | A | 9/1972 | Washecheck |
| 3,790,654 | A | 2/1974 | Bagley |
| 3,824,196 | A | 7/1974 | Benbow et al. |
| 4,364,888 | A | 12/1982 | Levin |
| 4,552,733 | A | 11/1985 | Thompson et al. |
| 4,631,267 | A | 12/1986 | Lachman et al. |
| 4,822,899 | A | 4/1989 | Groves et al. |
| 4,959,494 | A | 9/1990 | Felthouse |
| 5,011,516 | A | 4/1991 | Altman et al. |
| 5,059,574 | A * | 10/1991 | Abrevaya .................... 502/261 |
| 5,130,112 | A | 7/1992 | McAlister et al. |
| 5,145,825 | A | 9/1992 | Deeba et al. |
| 5,175,136 | A | 12/1992 | Felthouse |
| 5,264,200 | A | 11/1993 | Felthouse et al. |
| 5,264,299 | A | 11/1993 | Krasij et al. |
| 5,372,849 | A | 12/1994 | McCormick et al. |
| 5,395,972 | A | 3/1995 | Furutani et al. |
| 5,451,558 | A | 9/1995 | Campbell et al. |
| 5,589,596 | A | 12/1996 | Furutani et al. |
| 5,663,458 | A | 9/1997 | Ito et al. |
| 5,871,707 | A | 2/1999 | Hibi et al. |
| 5,908,607 | A | 6/1999 | Abekawa et al. |
| 6,037,307 | A | 3/2000 | Campbell et al. |
| 6,376,414 | B1 | 4/2002 | Antons et al. |
| 6,417,062 | B1 | 7/2002 | Foust et al. |
| 6,479,100 | B2 | 11/2002 | Jin et al. |
| 6,541,067 | B1 | 4/2003 | Marsh et al. |
| 6,605,735 | B2 | 8/2003 | Kawano et al. |
| 6,649,211 | B2 | 11/2003 | Lyons et al. |
| 6,677,068 | B2 | 1/2004 | Ioth et al. |
| 6,713,035 | B1 | 3/2004 | Iwanaga et al. |
| 6,800,937 | B2 | 10/2004 | Marsh et al. |
| 6,844,261 | B2 | 1/2005 | Marsh et al. |
| 6,852,667 | B2 | 2/2005 | Hibi et al. |
| 6,977,066 | B1 | 12/2005 | Iwanaga et al. |
| 2002/0028173 | A1 | 3/2002 | Hibi et al. |
| 2002/0131925 | A1 | 9/2002 | Shore et al. |
| 2002/0172640 | A1 | 11/2002 | Hibi et al. |
| 2003/0144143 | A1 | 7/2003 | Jordan et al. |
| 2004/0024244 | A1 | 2/2004 | Walsdorff et al. |
| 2004/0052718 | A1 | 3/2004 | Walsdorff et al. |
| 2005/0059839 | A1 | 3/2005 | Liu et al. |
| 2005/0100495 | A1 | 5/2005 | Chapat et al. |

FOREIGN PATENT DOCUMENTS

| | | | |
|---|---|---|---|
| DE | 19822280 A1 | | 11/1999 |
| EP | 722763 A1 * | | 7/1996 |
| EP | 0936184 A3 | | 6/2000 |
| EP | 1059118 A3 | | 6/2002 |
| GB | 1425631 | | 2/1976 |
| JP | 2000325790 | | 11/2000 |
| JP | 2002239387 | | 8/2002 |
| WO | 0043313 A1 | | 7/2000 |
| WO | 0110550 A1 | | 2/2001 |
| WO | 0160743 A1 | | 8/2001 |
| WO | 0198210 A1 | | 12/2001 |
| WO | 03064333 A1 | | 8/2003 |
| WO | 2004026761 A1 | | 4/2004 |
| WO | 2004030812 A3 | | 4/2004 |
| WO | 2005014470 A1 | | 2/2005 |
| WO | 2005021137 A1 | | 3/2005 |

OTHER PUBLICATIONS

Fan, "Adsorption Studies on RuO2(110) and Ru(1121) Surfaces," 2002, Dissertation, University of Berlin, 134 pgs.

Fomina, et al., "Oxosulphato-Complexes of Ruthenium," 1989, Russian J or Inorganic Chem, 34(6):879-882.

Ghatak, et al., "The Crystal and Molecular Structure of bis{-(u-sulphato-O'-O'-O")bis (triphenylphosphine) (sulphurdioxide)ruthenium(II)}} . (toluene) [Ru(SO4)(SO2)(PPh3)x]x . (C7H8)," 1979, Transition Metal Chem, 4/4:260-264.

Groves, et al., "Aerobic Epoxidation of Olefins with Ruthenium Porphyrin Catalysts," 1985, J Am Chem Soc, 107:5790-5792.

Ishiguro, et al., "Efficient Reduction of Sulfur Dioxide with Hydrogen Over TiO2-Supported Catalysts Derived from Ruthenium Salts and Ruthenium Cluster Complexes," 2002, J Catalysis, 206:159-164.

Ji, et al., "Environmentally Friendly Alcohol Oxidation Using Heterogeneous Catalyst in the Presence of Air at Room Temperature," 2002, Catalysis Comm, 3:511-517.

Jirsak T., et al., "Chemistry of SO2 on Ru(001): Formation of SO3 and SO4," 1998, Surface Science, 418:8-21.

Madhavaram, et al., "Oxidation Reactions Over RuO2: A Comparative Study of the Reactivity of the (110) Single Crystal and Polycrystalline Surfaces," 2001, J Catalysis, 12 pages, http://www.idealibrary.com.

Musawir, et al., "Highly Efficient Liquid-Phase Oxidatio of Primary Alcohols to Aldehydes with Oxygen Catalysed by Ru-Co Oxide," 2003, Chem Commun, pp. 1414-1415.

Qin, et al., "Catalytic Wet Air Oxidation of Ammonia Over Alumina Supported Metals," 1998, Applied Catalysis, 16/3:261-268 Abstract.

Reuter, et al., "First-Principles, Atomistic Thermodynamics for Oxidation Catalysis," 2002, Materials Science, arXiv: cond-mat/0211602 v1, 4 pages.

Reuter, et al., "Composition and Structure of the RuO2(110) Surface in an O2 and CO Environment: Implications for the Catalytic Formation of CO2," 2003, Materials Science, arXiv:cond-mat/0301602v1, 12 pages.

Sakka et al., "Formation of Sheets and Coating Films from Alkoxide Solutions," 1984, J Non-Crystalline Solids, 63 (1-2):223-235 (Abstract).

Shoji, T. et al., "Oxidation Catalyst for Sulfides and Sulfide Measuring Apparatus Equipped With The Catalyst," 2001, Database CA Chemical Abstracts Service, Abstract No. 134:10096.

Wendt, et al., "The Role of Weakly Bound on-top Oxygen in the Catalytic CO Oxidation Reaction over RuO1(110)," 2004, J. Am. Chem. Soc., 126(5), 1537-1541.

Wendt, et al., "Catalytic Activity of RuO2(110) in the Oxidation of CO," 2003, Catalysis Today, 85:167-175.

Wilke, T., et al., "Surface-Enhanced Raman Spectroscopy at Transition Metal-Gas Interfaces: Adsorption and Reactions of Sulfur Dioxide on Platinum-, Rhodium-, and Ruthenium-Coated Gold," 1991, J Catalysis, 130(1):62-75.

Wilkinson et al., "Alkyl compounds of ruthenium-(III) and -(V) and osmium(III). X-Ray crystal structures of hexakis (trimethylsilylmethyl)- and hexakis(neopentyl)diruthenium(III), dioxohexakis(trimethylsilylmethyl)diruthenium(V), and bis (3-allyl)tetrakis(neopentyl)diosmium(III)," 1986, JCS, Dalton Trans, 2711-2720. Abstract Only.

Zhan, et al., "Zeolite-Confined Nano-RuO2: A Green, Selective, and Efficient Catalyst for Aerobic Alcohol Oxidation," 2003, J Am Chem Soc, 125:2195-2199ZHAN, et al., "Zeolite-Confined Nano-RuO2: A Green, Selective, and Efficient Catalyst for Aerobic Alcohol Oxidation," 2003, J Am Chem Soc, 125:2195-2199.

Beziat et al., "Catalytic Wet Air Oxidation of Carboxylic Acids on TiO2-Supported Ruthenium Catalysts," 1999, J Catalysis, 182:129-135.

Bolzan et al., "Structural Studies of Rutile-Type Metal Dioxides," 1997, Acta Cryst, B53:373-380.

Broekhuis et al., "Monolith Catalytic Process for Producing Sorbitol: Catalyst Development and Evaluation," 2004, Ind Eng Chem Res, 43:5146-5155.

Dobrynkin et al., "Solid Catalysts for Wet Oxidation of Nitrogen-Containing Organic Compounds," 1998, Ctalysis Today, 45:257-260.

Floquet et al., "Effect of Ozone on Ruthenium Species in Alkaline Medium—Part 1: Oxidative Dissolution of Ruthenium Dioxide Hydrate," 2006, Radiochimica Acta, 94/1:5-13 (Abstract).

Haase, J., "Structural Studies of SO2 Adsorption on Metal Surfaces," 1997, J Phys: Condens Matter, 9:3647-3670.

King et al., "The Oxidation of Water by Cerium(iv) Catalysed by Nanoparticulate RuO2 on Mesoporous Silica," 2005, Dalton Trans, 1027-1032.

Lee et al., "Microstructures and Electrical Resistivities of the RuO2 Electrode on SiO2/Si Annealed in the Oxygen Ambient," 1997, J Mater Res, 11/11:2681.

Li et al., "Structures and Properties of Zirconia-Supported Ruthenium Oxide Catalysts for the Selective Oxidation of Methanol to Methyl Formate," 2006, J Phys Chem B, 110:23337-23342.

Liu et al., "Selective Oxidation of Methanol and Ethanol on Supported Ruthenium Oxide Clusters at Low Temperatures," 2005, J. Phys Chem B, 109:2155-2163.

Lundin et al., "Transition-Metal Dioxides with a Bulk Modulus Comparable to Diamond," 1998, Physical Review B, 57/9:4979-4982.

Matsushita et al., "Heterogeneously Catalyzed Aerobic Oxidation Biaryl Coupling of 2-Naphthols and Substituted Phenols in Water," 2005, J Am Chem Soc, 127/18:6632-6640.

Opre et al., "Promoted Ru-Hydroxyapatite: Designed Structure for the Fast and Highly Selective Oxidation of Alcohols with Oxygen," 2005, J Catalysis, 230:406-419.

Over et al., "Visualization of Atomic Processes on Ruthenium Dioxide Using Scanning Tunneling Microscopy," 2004, Chem Phys Chem, 5:167-174.

Park et al., "Gasification Reaction of Organic Compounds Catalyzed by RuO2 in Supercritical Water," 2003, Chem Commun, 694-695.

Ren et al., "Mesoporous Microcapsules with Noble Metal or Noble Metal Oxide Shells and Their Application in Electrocatalysis," 2004, J Mater Chem, 14:3548-3552.

Reuter et al., "The Steady State of Heterogeneous Catalysis, Studied by First-Principles Statistical Mechanics," 2004, Phys Rev Letters, 93/11:116105-1-116105-4.

Reuter K., "Insight into a Pressure and Materials Gap: CO Oxidation at Ruthenium" Catalysts, 2006, Oil & Gas Sci Tech, 61/4:471-477.

Rossi et al., "Ruthenium Dioxide Nanoparticles in Ionic Liquids: Synthesis, Characterization and Catalytic Properties in Hydrogenation of Olefins and Arenes," 2004, J Braz Chem Soc, 15/6:904-910.

Seki et al., "INOR233. Improved Hydrogen Chloride Oxidation Process: Characterization of the RuO2/TiO2 Catalyst,", 229th ACS Nat'l. Meeting, San Diego California, Mar. 13-17, 2005, Abstract INOR 233, 1 page.

Shen et al., "Synthesis and CO Oxidation Catalytic Character of High Surface Area Ruthenium Dioxide Replicated by Cubic Mesoporous Silica," 2005, Chem Letters, 34:390-391.

Vaidya et al., "Insight into Heterogeneous Catalytic Wet Oxidation of Phenol Over a Ru/TiO2 Catalyst," 2002, Chem Eng J, 87:403-416.

Wakita et al., "Effect of SO2 and H2S on CO Preferential Oxidation in H2-Rich Gas Over Ru/Al2O3 and Pt/Al2O3 Catalysts," 2005, Applied Catalysis A: General, 283:53-61.

Wang et al., "The Kinetics of CO Oxidation on RuO2(110): Bridging the Pressure Gap," 2002, J. Phys Chem B, 106:3422-3427 (Abstract).

Wang et al., "Interaction of NO with the Stoichiometric RuO2(110) Surface," 2003, J Phys Chem B, 107:13918-13924.

Wang et al., "Catalytic Oxidation of Ammonia on RuO2(110) Surfaces: Mechanism and Selectivity," 2005, J Phys Chem B, 109/16:7883-7893 (Abstract).

Wei et al., "Reaction Pathways and Site Requirements for the Activation and Chemical Conversion of Methane on Ru-Based Catalysts," 2004, J Phys Chem B, 108:7253-7262.

Zhao et al., "The Decomposition and Chemistry of Ru-3(CO)(12) on TiO2(110) Studied with X-Ray Photoelectron Spectroscopy and Temperature Programmed Desorption," 2005, Surface Sci, 575/1-2:115-124 (Abstract).

Zang, L., et al., "Room Temperature Oxidation of Carbon Monoxide Catalyzed by Hydrous Ruthenium Dioxide," 2000, Angew. Chem. Int. Ed., 39(21):3921-3922.

* cited by examiner

RUTHENIUM OXIDE CATALYSTS FOR CONVERSION OF SULFUR DIOXIDE TO SULFUR TRIOXIDE

This application is a United States National Stage Application based on International Application No. PCT/US2006/037357 and claims the benefit of U.S. Provisional Application Ser. No. 60/720,221, filed Sep. 23, 2005, the entire contents of which are incorporated herein by reference.

BACKGROUND OF THE INVENTION

The present invention relates generally to catalysts comprising ruthenium oxide and to processes for catalyzing the oxidation and conversion of sulfur dioxide ($SO_2$) to sulfur trioxide ($SO_3$) using such catalysts. More particularly, $SO_2$ at low concentrations in process gas streams can be effectively oxidized to $SO_3$ at relatively low temperatures using the ruthenium oxide catalysts of the present invention. For example, the catalysts comprising ruthenium oxide are particularly useful for conversion of $SO_2$ to $SO_3$ in the final contact stage of a multi-stage catalytic converter used in sulfuric acid manufacture.

The conventional contact process for the manufacture of sulfuric acid comprises catalytic gas phase oxidation of $SO_2$ to $SO_3$ in one or more catalytic oxidation stages of a converter to produce a conversion gas comprising $SO_3$, and absorbing the $SO_3$ in aqueous sulfuric acid to form additional sulfuric acid product. The catalytic oxidation of $SO_2$ to $SO_3$ proceeds at useful rates over solid particulate catalysts typically containing alkali-vanadium or platinum-containing active phases. $SO_2$ gas concentrations at the inlet to the first catalytic stage of the converter usually range from about 4% to about 15%. With adiabatic operation of each stage of the converter, three or four catalytic stages (or passes) are generally required to achieve overall $SO_2$ conversions in excess of 99.7% and satisfy absorber tail gas emission standards. External heat exchangers typically precede each catalyst pass following the first pass in order to cool the gas stream to the desired inlet temperature, with the fourth stage typically operating at from about 360° C. to about 415° C. Conversions of 99.7% of the first stage inlet $SO_2$ concentration are suitably obtained through a four stage double absorption design in which $SO_3$ is removed from the gas stream through a sulfuric acid irrigated absorption tower that follows the second catalytic stage (2:2 interpass absorption (IPA) design) or the third catalytic stage (3:1 IPA design) of the converter. $SO_2$ conversion of about 94% to about 95% is generally achieved in the first three stages, leaving the remainder to be converted in the fourth, or final, catalytic stage of the converter prior to passage through a final absorption tower for recovery of additional sulfuric acid product.

Prior art processes, such as described in U.S. Pat. No. 5,264,200 to Felthouse et al., effectively achieve a high total $SO_2$ conversion and acceptable $SO_2$ emission levels in the absorber tail gas by contacting the $SO_2$-containing gas with a monolithic catalyst having a platinum or alkali-vanadium-containing active phase in a series of preliminary catalytic stages prior to interpass absorption followed by a further pass through a final catalytic stage containing a particulate vanadium catalyst containing cesium (i.e., a Cs—V catalyst). By the use of a particulate Cs—V catalyst, the final stage reaction can proceed to thermodynamic equilibrium with a low inlet gas temperature range of from about 360° C. to about 415° C., a temperature range that favors a high conversion of $SO_2$ to $SO_3$.

Tomas Jirsak et al. in "Chemistry of $SO_2$ on Ru(001): formation of $SO_3$ and $SO_4$," *Surface Science* 418 pp. 8-21 (1998) describe the exposure of ruthenium (001) crystal to $SO_2$ and oxygen resulting in disassociation of $SO_2$ or decomposition or disproportionation that leads to the formation of $SO_3$ and $SO_4$.

In an effort to achieve economies of scale, contact sulfuric acid plants often are built with capacities of 1500 to 2500 metric tons per day (as 100% $H_2SO_4$). That rate of production requires relatively large diameter (e.g., 5 to 15 meter) catalytic converter vessels containing catalyst loadings on the order of from about 30 to about 50 liters per metric ton (as 100% $H_2SO_4$), or more, per stage. Increased catalytic efficiency would enable the use of lower catalyst loadings. Desirably, additional $SO_2$ conversion efficiency and lower process emissions could be attained through the use of a final stage catalyst having improved low temperature activity as compared to known $SO_2$ oxidation catalysts. There is a need, therefore, for an $SO_2$ oxidation catalyst that is stable and possesses high activity thereby enabling reduced catalyst loading requirements, higher gas velocities and associated reduced capital costs.

SUMMARY OF THE INVENTION

Among the objects of the present invention, therefore, are the provision of an oxidation catalyst for use in processes for oxidation of $SO_2$ to $SO_3$; the provision of an oxidation catalyst comprising a ruthenium oxide active phase; the provision of such an oxidation catalyst exhibiting stability and long catalyst life under acidic operating conditions; the provision of such an oxidation catalyst and processes suited for effective catalytic oxidation of $SO_2$ to $SO_3$ in feed gas mixtures having relatively low $SO_2$ gas strength and at relatively low operating temperatures; and the provision of such an oxidation catalyst adapted for conversion of $SO_2$ to $SO_3$ in the final catalytic stage of a converter used in the manufacture of sulfuric acid by the contact process.

Briefly, therefore, the present invention is directed to processes for the catalytic oxidation of $SO_2$ to $SO_3$. More particularly, $SO_2$ at low concentrations in process gas streams can be effectively oxidized to $SO_3$ at relatively low temperatures using the ruthenium oxide catalysts disclosed herein. In one embodiment, the process comprises contacting a feed gas mixture comprising $SO_2$ and oxygen with an oxidation catalyst comprising an active phase comprising ruthenium oxide thereby producing a conversion gas comprising $SO_3$.

The ruthenium oxide catalyst of the present invention is particularly suited for use as an oxidation catalyst in the conversion of $SO_2$ to $SO_3$ in one or more of the catalytic stages of a multiple stage catalytic converter used in sulfuric acid manufacture by the contact process. In one such embodiment, the present invention is directed to a process for making sulfuric acid and/or oleum from a source gas comprising $SO_2$. The process comprises forming a converter feed gas mixture by combining the source gas with an oxygen source and introducing the converter feed gas mixture into a catalytic converter comprising a plurality of catalyst stages in series. Each catalyst stage contains an oxidation catalyst effective for oxidizing $SO_2$ to $SO_3$. The converter feed gas mixture thereby contacts the oxidation catalyst contained in at least the first catalyst stage in the series to form a partial conversion gas comprising $SO_3$ and residual $SO_2$ and oxygen. The partial conversion gas is passed through at least one further catalyst stage in the series, the oxidation catalyst contained therein comprising an active phase comprising ruthenium oxide, thereby oxidizing residual $SO_2$ in the partial conversion gas to $SO_3$ and forming a conversion gas comprising $SO_3$ and residual $SO_2$. The conversion gas is contacted with an aqueous solution comprising sulfuric acid for absorption of $SO_3$ therefrom in a $SO_3$ absorption zone to produce additional sulfuric acid and/or oleum and a $SO_3$-depleted gas comprising $SO_2$.

The present invention is also directed an oxidation catalyst useful in the oxidation of $SO_2$ to $SO_3$. In one embodiment, the oxidation catalyst comprises an acid-resistant support and an active phase thereon. The active phase comprises ruthenium oxide having an average crystallite size of less than about 500 Å.

In accordance with another embodiment, the oxidation catalyst comprises an acid-resistant support and a promoted active phase on the surface of the support comprising ruthenium oxide and a promoter comprising a further metal oxide having a metal oxidation state of +4 or +3.

In accordance with a further embodiment, the oxidation catalyst comprises a support comprising microfluidized silica particles and colloidal silica particles and an active phase on the surface of the support comprising ruthenium oxide. The microfluidized silica is characterized as having a mean particle size of less than about 20 μm and the colloidal silica is characterized as having an average particle size of from about 10 nm to about 25 nm.

The present invention is further directed to processes and methods for the preparation of an oxidation catalyst comprising a ruthenium oxide-containing active phase. In one embodiment, the process for the preparation of the oxidation catalyst comprises combining a ruthenium salt solution and an acid-resistant support to form a slurry and adding a base to the slurry to form a catalyst precursor comprising a ruthenium oxide coating on the surface of the support. The catalyst precursor is heat treated at a first temperature of from about 200° C. to about 350° C. for from about 0.1 hour to about 5 hours, and at a second temperature from about 50° C. to about 500° C. for from about 0.1 hour to about 5 hours to convert the catalyst precursor to the oxidation catalyst comprising the support and an active phase thereon comprising ruthenium oxide.

In another embodiment, the process for the preparation of the ruthenium oxide catalyst comprises combining an acid-resistant support, microfluidized silica and colloidal silica to form a first slurry. The microfluidized silica is characterized as having a mean particle size of less than about 20 μm and the colloidal silica is characterized as having an average particle size of from about 10 nm to about 25 nanometers. A coated support is formed from the first slurry. A ruthenium salt solution is combined with the coated support to form a second slurry. Base is added to the second slurry to form a catalyst precursor comprising a ruthenium oxide coating on the surface of the coated support. Thereafter, the catalyst precursor is heat treated.

The present invention is further directed to a liquid dispersion comprising a liquid carrier phase, microfluidized silica slurry and colloidal silica slurry. The total silica content is greater than about 5 percent on a weight percent basis. The microfluidized silica slurry is characterized as having a viscosity at about 24° C. and about 15 weight percent solids of less than about 50 centipoise, the microfluidized silica is characterized as having a mean particle size of less than about 20 μm and the colloidal silica is characterized as having an average particle size of from about 10 nm to about 50 nanometers.

Other objects and features of this invention will be in part apparent and in part pointed out hereinafter.

DETAILED DESCRIPTION OF THE INVENTION

Figure 1:
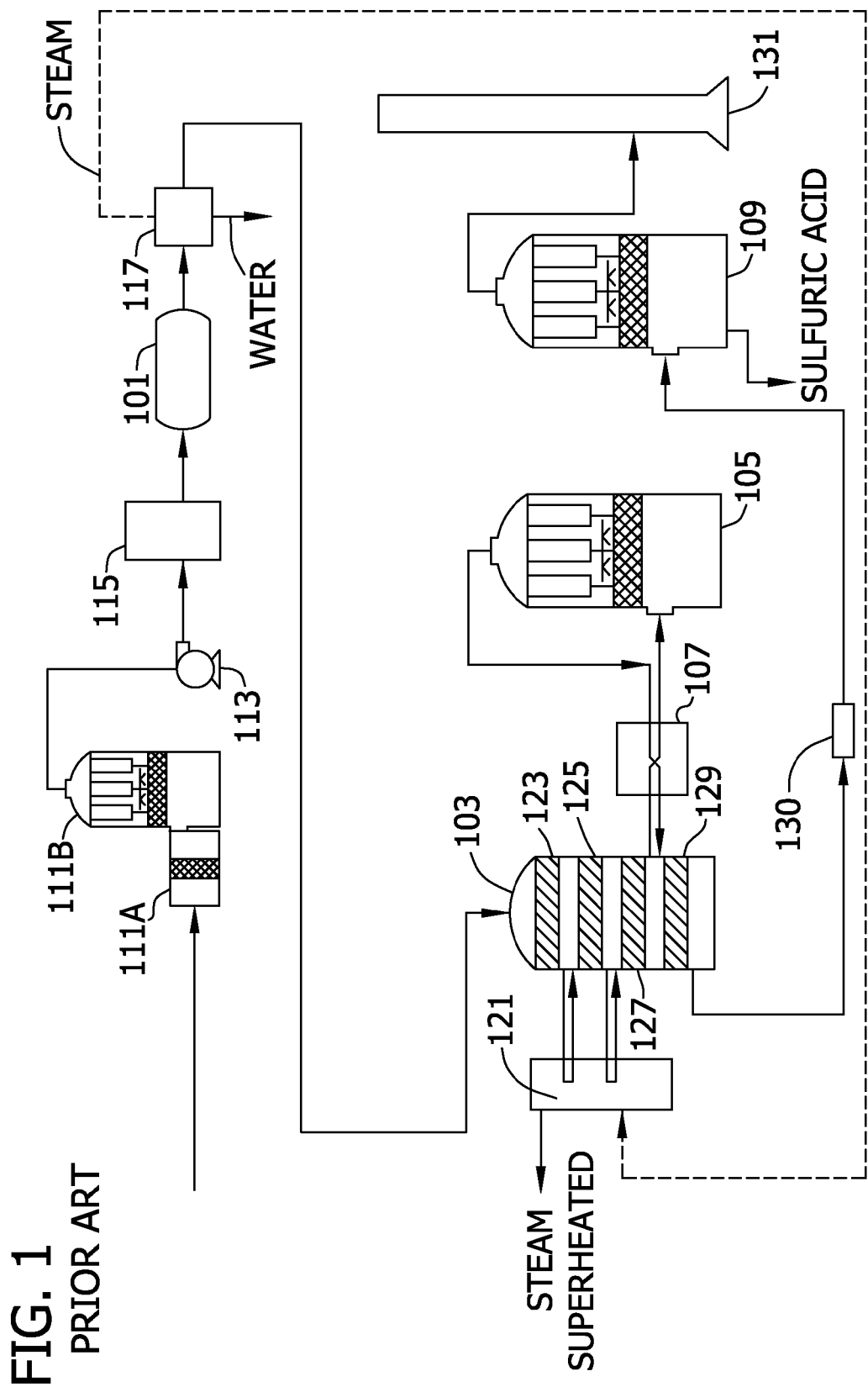
FIG. 1 is a schematic of a conventional contact process for the manufacture of sulfuric acid in which the ruthenium oxide catalyst of the present invention may advantageously be used.

The catalyst of the present invention comprises a ruthenium oxide-containing active phase. The catalyst is useful in the oxidation of $SO_2$ to $SO_3$ at relatively low temperatures, for example, less than about 400° C. The catalyst has particular utility in the conversion of residual $SO_2$ in the final catalytic stage of a converter used in commercial scale manufacture of sulfuric acid by the contact process.

Ruthenium oxide catalysts of the present invention provide improved low temperature conversion of $SO_2$ to $SO_3$ in gas streams having relatively low $SO_2$ content. For instance, in Table 2 of Example 6, supported ruthenium oxide catalysts (catalysts 2-5) were shown to provide significantly greater $SO_2$ conversion in a gas stream containing 0.5% $SO_2$ and 7% oxygen over a temperature range of 250° C. to 375° C. as compared to a conventional supported catalyst containing a mixture of cesium oxide ($Cs_2O$), potassium oxide ($K_2O$) and vanadium pentoxide ($V_2O_5$).

The supported catalysts of the present invention are capable of achieving 98%, 99%, or even as high as 99.9% to essentially 100% low temperature conversion of $SO_2$ to $SO_3$ contained in gas streams. In particular, the supported catalysts of the present invention are capable of achieving less than 0.01% $SO_2$ (less than 100 ppmv), less than 0.005% $SO_2$ (less than 50 ppmv), less than 0.004% $SO_2$ (less than 40 ppmv), less than 0.003% $SO_2$ (less than 30 ppmv), less than 0.002% $SO_2$ (less than 20 ppmv), or even less than 0.001% $SO_2$ (less than 10 ppmv) in gas streams originally containing up to about 1% $SO_2$. Additionally, the catalysts disclosed herein provide for higher gas velocity and improved chemical and thermal stability.

As described in greater detail below, the catalysts of the present invention may comprise an unsupported ruthenium oxide-containing active phase. Preferably, however, the catalyst active phase is present on a support. Suitable supports include monoliths (e.g., honeycombs or other structured supports having foraminal openings, cells or channels for the flow of the $SO_2$-containing gas at relatively high velocity and low pressure drop) as well as smaller dimensioned supports for the preparation of catalyst bodies intended for use in a fixed or packed catalyst bed arrangement. In one embodiment, the catalyst has a ruthenium oxide active phase characterized by an average crystallite size of less than about 500 Å, thereby imparting enhanced activity and stability.

The catalysts may be suitably prepared by solution-based deposition processes comprising dissolving a ruthenium oxide precursor compound in a suitable solvent. A catalyst precursor solid may thereafter be precipitated from the solution, for example, by pH adjustment and/or heating the solution. In those embodiments wherein the ruthenium oxide-containing active phase of the oxidation catalyst is present on a support, the catalyst precursor solid can be precipitated from solution onto the catalyst support. Following precipitation, the ruthenium oxide catalyst precursor is isolated from the solution and optionally dried prior to conversion of the precursor to ruthenium oxide and activation thereof, for example, by calcination of the precursor in an oxidizing atmosphere. Alternatively, the solution containing the ruthenium oxide precursor compound may be used to wet or soak a catalyst support followed by optional drying and conversion of the precursor compound to form a ruthenium oxide-containing active phase on the surface of the catalyst support. The catalyst support can optionally comprise a high surface area washcoat upon which the ruthenium oxide-containing active phase is formed. In some embodiments, the ruthenium oxide catalyst precursor may be subjected to reductive treatment.

Ruthenium Oxide Active Phase

In the ruthenium oxide-containing active phase of the catalyst, at least about 10%, on a ruthenium molar basis, of the active component ruthenium is in the form of ruthenium oxide. Preferably, at least 20%, 30%, 40%, 50%, 60%, 70%, 80% 90%, 95%, 96%, 97%, 98% and as much as at least 99% or more of the ruthenium is present in the form of ruthenium oxide. The ruthenium oxide-containing active phase may contain ruthenium in various oxidation states, for example ruthenium in the +2, +3, +4 and/or +8 oxidation state(s) is suitable in the practice of the present invention. A ruthenium oxide active phase comprising lower-valence ruthenium oxides such as $RuO$, $Ru_2O_3$ and/or $RuO_2$ is preferred. Ruthenium oxides and ruthenium oxide hydrates in which the ruthenium is present in the +4 oxidation state such as $RuO_2$ are especially preferred in the active phase.

The active phase may additionally comprise ruthenium that is not in the form of an oxide. For instance, ruthenium metal, ruthenium hydroxide ($Ru(OH)_3$), or residual ruthenium oxide precursor compound from which the active phase is produced (e.g., a ruthenium halide salt such as $RuCl_3$ or other ruthenium oxide precursor compound) may be present in the ruthenium oxide-containing active phase. Furthermore, as described in greater detail below, the ruthenium oxide active phase may include one or more promoter metals, typically present in the form of a metal oxide.

It has been discovered that ruthenium oxide crystallite size in the active phase influences low temperature catalytic activity as well as chemical and thermal stability. In particular, decreased crystallite size provides higher catalytic activity and increased catalyst life. Crystallite size is typically measured using X-ray diffraction (XRD) or electron microscopy techniques, particularly high-resolution transmission electron microscopy where the crystallite sizes are observed directly and the particle size distribution determined based on the compiled observations. It is believed that an average ruthenium oxide crystallite size of less than about 500 Å enhances activity by maximizing the active surface area per unit catalyst volume. It is further believed that $SO_2$ molecules must be chemisorbed on the catalyst surface to allow the approach of the oxygen atoms that will participate in the formation and desorption of $SO_3$. However, chemisorbed $SO_2$ can weaken the adhesion properties as between the ruthenium oxide active phase and a support carrying the active phase leading to catalyst instability. Under one theory, it is believed that the catalysts of the present invention provide enhanced catalyst stability by virtue of increased catalytic surface area and therefore increased activity such that $SO_2$ chemisorption and $SO_3$ desorption occur rapidly thereby limiting the amount of time that the catalyst is exposed to chemisorbed $SO_2$. $SO_2$ oxidation catalysts in accordance with the present invention having an average ruthenium oxide crystallite size of less than about 500 Å have been found to exhibit greater activity and stability. Preferably, the ruthenium oxide-containing active phase of the catalyst exhibits an average ruthenium oxide crystallite size of less than about 450 Å, less than about 400 Å, less than about 350 Å, less than about 300 Å, less than about 250 Å, less than about 200 Å, less than about 150 Å, or even less than about 100 Å. Preferably, the ruthenium oxide-containing active phase comprises ruthenium oxide crystallites ranging in size from about 10 Å to about 500 Å, more preferably from about 20 Å to about 300 Å, still more preferably from about 30 Å to about 100 Å, and yet even more preferably from about 50 Å to about 80 Å.

Various methods for preparation of catalysts comprising an unsupported or supported ruthenium oxide-containing active phase including techniques to control ruthenium oxide crystallite size are disclosed in detail below.

Ruthenium Oxide Precursor Compounds and Solutions

The solution-based deposition techniques used to prepare the catalysts of the present invention comprise dissolving a ruthenium oxide precursor compound in a solvent. Ruthenium oxide precursor compounds include, for example, the following compounds, their hydrates and mixtures thereof: ruthenium oxide; ruthenium hydroxide; ruthenium halides such as ruthenium chloride, ruthenium bromide and ruthenium iodide; halogeno-acids such as chlororuthenic acid, bromoruthenic acid and iodoruthenic acid; oxy acids such as ruthenic acid; alkali metal salts or ammonium salts of chlororuthenic acid or ruthenic acid, such as sodium chlororuthenate and sodium ruthenate; ruthenium salts of inorganic acids, such as ruthenium nitrosyl nitrate, ruthenium nitrate, ruthenium acetate and ruthenium sulfate; ruthenium 2,4-pentanedionate; and coordination complexes such as tetrammine ruthenium halides, and tri-nuclear ruthenium carboxylate species, such as ruthenium (III, III, III) μ-oxoacetate trihydrate and $μ_3$-oxohexakis(μ-acetato)triaquatriruthenium acetate $(Ru_3O(O_2CCH_3)_6(H_2O)_3(CH_3CO_2)$. The solvent can be aqueous, organic, or a mixture thereof and is selected such that the ruthenium oxide precursor compound is readily soluble therein under the initial conditions of the dissolution step. Suitable organic solvents include $C_{1-4}$ alcohols. However, water is the preferred solvent used in conjunction with water-soluble ruthenium oxide precursor compounds such as ruthenium(III) trichloride hydrate and ruthenium nitrosyl nitrate hydrate and other hydrated ruthenium halide or nitrate salts.

Unsupported Ruthenium Oxide Active Phase

A catalyst comprising an unsupported ruthenium oxide active phase may be suitably prepared by first dissolving a ruthenium oxide precursor compound in a solvent. The ruthenium oxide precursor compound is generally dissolved in the solvent at a concentration of from about 0.01 molar and about 5 molar, preferably from about 0.1 molar and about 5 molar, and more preferably from about 0.1 molar and about 3 molar, as calculated on a ruthenium effective unit basis. For example, in the case of a tri-nuclear ruthenium complex used as the ruthenium oxide precursor compound, molarity of the solution is calculated by dividing the molecular weight of the complex by three to give the molecular weight of a mononuclear species of ruthenium.

The dissolved ruthenium oxide precursor compound (i.e., solute) is precipitated from the precursor solution to form a slurry comprising a ruthenium oxide catalyst precursor solid. Various techniques and combinations of techniques known to those skilled in the art can be employed to induce precipitation of the ruthenium oxide catalyst precursor from the solution (e.g., insolubilization or supersaturation techniques), including pH adjustment, solvent removal (i.e., evaporation), heating, temperature reduction by cooling or "flash crystallization" of the precursor solution and addition of a second or co-solvent in which the solute exhibits low solubility. Regardless of the technique employed, the ruthenium oxide catalyst precursor solid is preferably precipitated from solution over a period of time sufficient to assure a continuous and even precipitation of a highly dispersed, amorphous, small particle size ruthenium oxide catalyst precursor solid. That is, inducement of rapid, or essentially instantaneous, insolubilization and/or precipitation is preferably avoided to assure that a substantially homogeneous, small particle ruthenium oxide catalyst precursor solid is obtained.

In a preferred embodiment, the ruthenium oxide catalyst precursor solid is an amorphous ruthenium oxide hydrate. It has been discovered that hydrated ruthenium oxide catalyst precursor solids provide ruthenium oxide catalysts having improved activity, chemical stability and thermal stability. In the case of a water-soluble salt of ruthenium, conversion to ruthenium oxide hydrate occurs in a multi-step route involving hydroxide ions that is not completely understood.

In one embodiment, a ruthenium oxide catalyst precursor solid comprising ruthenium oxide hydrate can be precipitated from the precursor solution using a pH adjustment technique. An acidic aqueous precursor solution having a ruthenium halide salt or a ruthenium nitrate salt dissolved therein is treated with a suitable base to effect neutralization (i.e., raise the pH) and precipitation of a slurry of amorphous ruthenium oxide hydrate from the solution. The base used can be solid, liquid or gas and preferably is selected from ammonia, ammonium hydroxide, sodium hydroxide and potassium hydroxide. Ammonia gas is preferred in cases where gas addition is advantageous, such as coupling ammonia addition with a dewatering unit operation. In the case of basic solutions used for pH adjustment, the solutions preferably have a base concentration in excess of about 5 w/v %, more preferably at least 10 w/v %, 15 w/v %, 20 w/v % or even 25 w/v % percent. The base and precursor solution comprising the ruthenium oxide precursor compound can be combined using any order of addition. In one embodiment, the precursor solution is added slowly to a concentrated base solution (e.g., an ammonium hydroxide solution) with agitation over an extended period of time, for example, over a period of at least about 15 minutes, about 30 minutes, about 45 minutes, or at least about 60 minutes or longer. Agitation of the slurry is continued after completion of the addition of the precursor solution for at least about 15 minutes, about 30 minutes, about 45 minutes, about 60 minutes, about 75 minutes, about 90 minutes or longer to ensure a homogeneous ruthenium oxide catalyst precursor precipitate is obtained. The temperature is preferably maintained below boiling or reflux during precipitation, preferably from about 20° C. to about 95° C.

In another embodiment for the preparation of the ruthenium oxide catalyst precursor precipitate, a ruthenium oxide precursor solution can be heated to a temperature sufficient such that amorphous ruthenium oxide hydrate precipitates from solution. A solvent or solvent system comprising water is preferred. For example, an aqueous ruthenium oxide precursor solution can be heated to a temperature of from about 70° C. to about 95° C. to precipitate ruthenium oxide hydrate. The heating rate is preferably controlled in order to selectively produce solids that are highly dispersed. Generally, rapid heating should be avoided to prevent localized, inhomogeneous, precipitation. Some aqueous solutions of ruthenium oxide precursor compounds, such as ruthenium chloride, are acidic and have pH values of about 1 or lower. After heat induced precipitation, the pH of can be adjusted with a suitable base such as ammonia gas, ammonium hydroxide, sodium hydroxide or potassium hydroxide.

Once formed, the ruthenium oxide catalyst precursor solid wet cake is isolated from the slurry by any solid-liquid separation technique known in the art, such as filtration or centrifugation. Impurities can be removed from the isolated wet cake by washing with a solvent such as water or with weak process liquors. The wet isolated catalyst precursor is then optionally dried. Drying can be conducted by any technique known in the art, such as tray drying, fluidized bed drying, spray drying or vacuum oven drying. Drying is preferably conducted at a temperature of from about 100° C. to about 200° C. in a vacuum oven. The ruthenium oxide catalyst precursor solid is dried until sufficient moisture has been removed so that a substantially free-flowing powder is obtained. Drying time is typically at least about 0.5 hours to about 5 hours or longer.

The ruthenium oxide catalyst precursor powder or solid may optionally be pressed into wafers or other shapes using methods and apparatus known to those skilled in the art, such as a Carver press suitable for lab-scale preparation or a rotary tableting press. The wafers or other pressed shapes may then be reduced in size (e.g., using a hammer mill, ball mill or other particle size reduction method known in the art) and sieved to yield ruthenium oxide catalyst precursor powders or granules exhibiting a relatively uniform particle size distribution. For example, powders having a particle size range from about 1 µm to about 100 µm or larger aggregates, for instance, mesh size fractions of 10-12 mesh size can be prepared.

The ruthenium oxide catalyst precursor solids are activated by thermal processing (i.e., high temperature calcination) at temperatures of from about 200° C. to about 600° C., more preferably from about 300° C. to about 500° C., for from about 0.5 to about 12 hours in an atmosphere comprising oxygen (e.g., air calcination) and/or $SO_2$. High temperature activation can be conducted in multiple stages at different temperatures. For example, the ruthenium oxide catalyst precursor solid may be subjected to a first calcining stage at from about 200° C. to about 300° C., followed by a second calcining stage at from about 300° C. to about 600° C. Each stage can be followed by a ramped heating step to the temperature maintained in the subsequent stage.

It has also been discovered that in some instances reduction of ruthenium oxide precursor solids yields a ruthenium oxide active phase having desirable crystallite size, catalyst activity and/or catalyst life properties. It is believed that reduction leads to formation of well-dispersed, mechanically adherent ruthenium metal crystallites that when exposed to an oxidizing atmosphere at elevated temperatures converts to a ruthenium oxide catalyst effective for $SO_2$ oxidation. However, the benefits attendant reduction of the ruthenium oxide precursor solid appears to be dependent upon the precursor compound used to form the precursor solid. In particular, reductive treatment appears to be beneficial when the ruthenium oxide precursor solid is formed using a ruthenium salt such as ruthenium chloride or ruthenium nitrosyl nitrate. Suitable reducing agents include, for example, hydrogen for gas-phase reductions or solutions of sodium borohydride, lithium borohydride, potassium triacetylborohydride, formaldehyde, formic acid, sodium formate, hydrazine hydrochloride, hydroxylamine, borane, borane-THF, borane-pyridine, lithium aluminum hydride, aluminum hydride and hypophosphorous acid for liquid-phase reductions. Gas-phase reduction of the ruthenium oxide precursor solids is carried out prior to activation of the ruthenium oxide-containing catalyst. The dried ruthenium oxide catalyst precursor solid isolated from the precursor slurry may be contacted with a reducing gas such as hydrogen at elevated temperature. The concentration of the reducing gas in the reducing atmosphere is preferably from about 1% to about 10%, more preferably from about 1% to about 5% with the balance consisting essentially of a suitable inert gas such as nitrogen. In one preferred embodiment, the reducing atmosphere comprises between about 2% and about 5% hydrogen with the remainder consisting essentially of nitrogen. Preferred temperature ranges for gas-phase reduction depend on the ruthenium salt. In the case of ruthenium chloride, a reduction temperature range of from about 150° C. to about 250° C. is preferred, with a temperature of about 200° C. more preferred. In the case of ruthenium nitrate, a reduction temperature range of from about 125° C. to about 175° C. is preferred, with a temperature of about 150° C. more preferred. In the case of gas-phase reduction in the presence of hydrogen of a precursor formed from ruthenium chloride, ruthenium metal and gaseous hydrochloric acid are products of the reduction reaction. In the case of gas-phase reduction in hydrogen of a precursor formed from ruthenium nitrate, ruthenium metal and gaseous nitric acid are products of the reduction reaction. The rate of byproduct gas generation can be monitored in order to determine when conversion to ruthenium metal is essentially complete. Gas-phase reduction treatment times are generally less than about 24 hours, for example, less than about 20 hours, less than about 16 hours, less than about 12 hours, and typically less than about 8 hours.

The BET surface area exhibited by the calcined ruthenium oxide catalyst following activation is typically at least about 25 $m^2/g$, preferably at least about 50 $m^2/g$, at least about 75 $m^2/g$, and even at least about 100 $m^2/g$. BET surface area refers to surface area determined in accordance with the well-known Brunauer-Emmett-Teller method and, unless otherwise stated, all surface area descriptions contained herein are in reference to BET surface area.

The unsupported activated ruthenium oxide catalyst is suitable for use as an oxidation catalyst in the conversion of $SO_2$ to $SO_3$. The powder or granules can optionally be combined with binders known to those skilled in the art and then tableted or otherwise formed into various shapes of the desired size for use in a fixed or packed catalyst bed arrangement through which the $SO_2$-containing gas is passed.

One example of the preparation of an unsupported ruthenium oxide catalyst in accordance with the present invention and evaluation thereof in the oxidation of $SO_2$ to $SO_3$ is set forth in Example 6 below.

Supported Ruthenium Oxide Active Phase

In accordance with a preferred embodiment, the oxidation catalyst of the present invention comprises a ruthenium oxide-containing active phase at the surface of a catalyst support or carrier. For reasons of economy, use of a catalyst support is preferred to provide a catalyst in which a greater proportion of ruthenium oxide is exposed per unit volume of the active phase. The catalyst supports can optionally comprise a high surface area washcoat at the surface of the support.

The ruthenium oxide-containing active phase is typically present on the support in an amount of, but not limited to, less than about 10%, 9%, 8%, 7%, 6%, 5%, 4%, 3% or even less than about 2% by weight of the catalyst. Preferred component ranges for the active phase comprising ruthenium oxide are from about 0.1% to about 10%, from about 0.5% to about 10%, from about 0.5% to about 5%, from about 0.5% to about 4%, from about 0.5% to about 3%, or even from about 0.5% to about 2% by weight of the catalyst. On a weight per volume basis, the supported catalyst of the present invention typically contains less than about 20 kg ruthenium per cubic meter of catalyst volume, less than about 15 kg ruthenium per cubic meter, less than about 10 kg ruthenium per cubic meter, preferably less than about 5 kg ruthenium per cubic meter, more preferably less than about 4 kg ruthenium per cubic meter, more preferably less than about 3 kg ruthenium per cubic meter, and even more preferably less than about 2 kg ruthenium per cubic meter of catalyst volume.

Preferred supports are generally characterized by high external surface area, thereby exposing a high proportion of the ruthenium oxide per unit volume of active phase, and providing high reaction efficiency, low pressure drop, and catalytic stability. In the acidic environment encountered by catalysts used in the catalytic conversion of $SO_2$ to $SO_3$, supports made from or comprising acid-resistant materials are preferred because of their chemical stability under those conditions. Suitable acid-resistant support materials include, for example, silicate (i.e., compounds containing silicon, oxygen and one or more metals with or without hydrogen), mullite (i.e., aluminum silicate), cordierite, zirconia, zirconium hydroxide, stainless steel, ferritic steels and nickel-based alloys such as INCONEL and HASTELLOY. Suitable acid-resistant supports can also include a combination of silica with one or more compounds selected from zirconium oxide ($ZrO_2$), aluminum oxide ($Al_2O_3$), titanium dioxide ($TiO_2$), stannic oxide ($SnO_2$) and lanthanum oxide ($La_2O_3$). In one embodiment, supports comprise a combination of silicates and one or more of a zirconium compound, a tin compound or a titanium compound. In such an embodiment, the silica compound typically comprises at least about 80 wt %, about 85 wt % or about 90 wt % of the support.

The support for the ruthenium oxide-containing active phase can be of various sizes and shapes known in the art including those adapted for use in fixed or packed catalyst bed arrangements comprising randomly dispersed catalyst bodies of relatively small dimension such as, for example, powders, particulates, granules, rings (e.g., Raschig rings and Pall rings), wheels, saddles, spherical or cylindrical shapes, ripple shapes, star shapes, window-lattice shapes and lobe shapes. Examples of suitable particulate and shaped supports include those made from $SiO_2$, $Zr(OH)_4$ and $ZrO_2$.

Examples of suitable powder supports include silicates such as $SiO_2$ and silicates of aluminum (e.g., zeolites) having relatively low alumina content (e.g., less than about 1% by weight) to render them sufficiently acid-resistant, zirconium compounds such as $ZrO_2$ and $Zr(OH)_4$, tin compounds such as $SnO_2$ and titanium compounds such as $TiO_2$. One preferred powder support comprises mesoporous zirconia ($ZrO_2$). Preferably the mesopores have a diameter of less than about 50 nm, 40 nm or even 30 nm. The mesopores can have a uniform or non-uniform distribution. Powder support materials having an average particle size of from about 0.1 μm to about 200 μm, from about 0.5 μm to about 100 μm, and even about 1 μm to about 50 μm are preferred. In one embodiment, the diameter of the powder support is from about 2 μm to about 10 μm, and in another embodiment from about 2 μm to about 5 μm.

It has been discovered that high surface area supports contribute to reduced ruthenium crystallite size and increased activity and catalyst life. Based on experimental evidence to date, it is believed that high surface area supports result in highly dispersed ruthenium oxide-containing active layers that are chemically stable and thermally stable in the presence reactive gases such as oxygen, $SO_2$ and $SO_3$. Supports having a surface area of at least about 50 $m^2/g$ are preferred, for example from about 50 $m^2/g$ to about 500 $m^2/g$, more preferably from about 100 $m^2/g$ to about 300 $m^2/g$, and still more preferably about 150 $m^2/g$ to about 250 $m^2/g$.

Catalyst support porosity can be defined based on a pore size distribution. Under one scheme, as suggested by IUPAC and used herein, micropores are defined as having a pore size of less than about 20 Å, mesopores as having a pore size of between about 20 Å and about 500 Å, and macropores as having a pore size of greater than about 500 Å. A support or washcoat typically comprises a combination of micropores, mesopores and macropores, with the ratios thereof varying with surface area and pore volume. For instance, high surface area and pore volume washcoats may have a distribution skewed toward the micropore size range whereas relatively low surface area and pore volume catalyst supports may have a distribution skewed toward mesopores and/or macropores.

For porous supports and washcoats, materials having a pore volume of from about 0.1 $cm^3/g$ to about 3.0 $cm^3/g$ are preferred, more preferably from about 0.3 $cm^3/g$ to about 1.2 $cm^3/g$, and still more preferably from about 0.6 $cm^3/g$ to about 1.0 $cm^3/g$. Materials having a pore size distribution with at least about 2%, 3%, 4%, 5%, 6%, 7%, 8%, 9% or 10% of the pore volume attributable to pores having a diameter of less than about 20 Å (i.e., micropores), at least about 30%, 35%, 40%, 45%, 50%, 55%, 60%, 65%, 70% or 75% of the pore volume attributable to pores having a diameter of between about 20 Å and about 500 Å (i.e., mesopores), and at least about 2%, 3%, 4%, 5%, 6%, 7%, 8%, 9% or 10% of the pore volume attributable to pores having a diameter of greater than 500 Å (i.e., macropores) are preferred. In one embodiment, the support or washcoat materials have a pore size distribution with at least about 5% of the pore volume attributable to pores having a diameter of less than about 20 Å, at least about 50% of the pore volume attributable to pores having a diameter of between about 20 Å and about 500 Å, and at least about 5% of the pore volume attributable to pores having a diameter of greater than 500 Å.

In accordance with one preferred embodiment of the invention, the support is in the form of a relatively large-sized monolith such as, for example, a honeycomb, having foraminal openings, cells or channels for the flow of the $SO_2$-containing gas through the catalyst body and adapted for use in a catalyst bed comprising an ordered or structured assembly of the catalyst monoliths. The honeycomb or monolith support may have various cell diameters and cross-sections (e.g., square cells, although the choice may vary with the specific application) and cell densities, but the cells are generally large enough so that the support does not significantly impede the flow of $SO_2$-containing gas at high velocity. Monolithic catalysts provide increased process efficiency by permitting high velocity flow of the $SO_2$-containing gas at relatively low pressure drop.

Materials suitable for the preparation of foraminous monolith supports include cordierite (orthorhombic magnesium aluminum metasilicate; $Mg_2Al_4O_3(SiO_3)_5$), mullite ($3Al_2O_3 \cdot 2SiO_2$), silica, zirconia ($ZrO_2$) and α-alumina. Two preferred materials for use in this invention are mullite and silica. Silica is especially preferred.

Suitable nominal cell densities of honeycomb monolith supports include 9, 16, 25, 50, 100, 200, 300, 400, 500, 600, 700, 800 and 900 cell per square inch (cpsi). For the present invention, the preferred cell density is from about 100 to about 400 cpsi of a cross section taken transverse to the direction of gas flow through the monolith catalyst. More preferably, the cell density is from about 100 to about 300 cpsi. In one embodiment, the permeability of the foraminous support is such that the pressure drop of a gas comprising $SO_2$, oxygen and nitrogen flowing at a velocity of 600 standard feet per minute (183 meters per minute) through a monolithic catalyst comprising such support is not greater than about 8 inches water per lineal foot (0.066 atmospheres per meter) in the direction of flow. Typically the foraminous void fraction of the monolith is in the range of between about 0.25 and about 0.75.

Monolith supports having a BET surface area of at least about 15 $m^2/g$, for example, from about 15 $m^2/g$ to about 50 $m^2/g$, are preferred. In one embodiment, the ruthenium oxide-containing active phase is located at the foraminal wall surfaces defining the gas passages or channels through the monolith and having a finely porous (often microporous) surface coating that is either an integral part of the monolith support, as generated in the preparation of the support, or is provided subsequently by way of a washcoat film. For example, an integral high surface area surface may be provided at the foraminal wall surfaces of the monolith support where the support is produced by co-extrusion of a high surface area/ high porosity oxide together with a lower surface area/lower porosity oxide. Suitable supports for the preparation of monolithic catalysts of this invention include thin-walled honeycomb structures. Representative methods for the manufacture of such supports are disclosed in U.S. Pat. Nos. 3,790,654, 4,364,888, 5,175,136 and 5,264,200, the disclosures of which are expressly incorporated herein by reference.

U.S. Pat. No. 5,264,200 describes honeycomb monolith supports that combine a high porosity oxide with a low surface area oxide to produce a composite material that possesses the permeability desired for gas flow, the fine porosity desired for effective catalyst activity and the mechanical strength conferred through the use of a low surface area oxide. Typical materials for the preparation of those silica composite honeycombs include a low density, high porosity silica powder having an average particle less than about 20 microns; and low surface area silica particles having a particle size from about 20 to about 75 microns. A plasticized mixture (or "dough") suitable for extrusion is made through the addition of an aqueous phase comprising water and a lower alcohol such as, for example, isopropyl alcohol. U.S. Pat. No. 5,264,200 describes the material for the monolithic catalysts as silica extruded in nominally 100 to 300 cpsi with square cells. Those composite silica supports have total pore volumes from 0.25 to 0.50 $cm^3/g$ with surface areas of from 15 to 50 $m^2/g$. Higher pore volumes (0.50 to 0.75 $cm^3/g$) are obtainable, but the resulting silica monolithic supports may lack adequate mechanical strength. Mechanical strength is adequate where the modulus of rupture is greater than about 500 pounds per square inch (about 350,000 $kg/m^2$). The high porosity silica component of the silica composite monolithic support of U.S. Pat. No. 5,264,200 was selected from several silica powders with high surface areas (100 to 500 $m^2/g$) or silicas with low surface areas (below 10 $m^2/g$), but high pore volumes such as diatomaceous earths. These silica honeycombs described in U.S. Pat. No. 5,264,200 are suitable for use in supporting the ruthenium oxide-containing active phase of the present invention. Table I of U.S. Pat. No. 5,264,200, reproduced below, provides a listing of representative composite silica honeycombs. The 200 cpsi honeycombs are characterized by the mercury intrusion porosimetry and water absorption data given. Honeycombs coded 3 and 4 were prepared using 10 and 20% diatomaceous earth, respectively.

TABLE I

|  | Honeycomb Code[a] | | |
| --- | --- | --- | --- |
|  | 1 | 2 | 3 |
| Total Intrusion Volume,[b] $cm^3/g$ | 0.303 | 0.309 | 0.375 |
| Total Pore Area,[b] $m^2/g$ | 22.2 | 22.8 | 16.9 |
| Median Pore Diameter,[b] μm | 0.370 | 0.387 | 0.564 |
| Average Pore Diameter,[b] μm | 0.0548 | 0.0541 | 0.0887 |
| Bulk Density,[b] $g/cm^3$ | 1.38 | 1.44 | 1.28 |
| Water Pore Volume,[c] $cm^3/g$ | 0.29 | 0.29 | 0.30 |
|  | Honeycomb Code[a] | | |
|  | 4 | 5 | 6 |
| Total Intrusion Volume,[b] $cm^3/g$ | 0.419 | 0.390 | 0.361 |
| Total Pore Area,[b] $m^2/g$ | 40.1 | 36.1 | 20.6 |
| Median Pore Diameter,[b] μm | 0.633 | 0.420 | 0.524 |
| Average Pore Diameter,[b] μm | 0.0418 | 0.0432 | 0.0699 |
| Bulk Density,[b] $g/cm^3$ | 1.25 | 1.26 | 1.26 |
| Water Pore Volume,[c] $cm^3/g$ | 0.35 | 0.33 | 0.34 |

[a]Those honeycombs all had square cells with about 200 cells per square inch.
[b]Determined through mercury intrusion porosimetry using a Micrometrics Autopore 9220-11.
[c]Determined through modification of ASTM Method C127-84. "Standard Test Method for Specific Gravity and Absorption of Coarse Aggregate." Values shown represented average multiple determinations.

The composite silica honeycombs of U.S. Pat. No. 5,264,200 exhibit a very wide range of surface area at the foraminal walls of the support. Where a high surface area/high porosity silica was used in the preparation of the honeycomb, the surface area ranged from 100 to 400 $m^2/g$ of the monolith, with a pore volume of 0.5 to 2 $cm^3/g$. Where diatomaceous earth was used, the surface area ranged as low as 2 $m^2/g$, with a porosity in the range of 1 $cm^3/g$.

The silica honeycombs described above are representative of a type of monolith support for the ruthenium oxide-containing active phase for use in the oxidation of $SO_2$, especially when prepared using a diatomaceous earth component for porosity in the composite honeycomb material. These all-silica monolith supports are possible alternatives to washcoated honeycombs. In a preferred embodiment, a very effective support for a ruthenium oxide-containing active phase in accordance with the present invention is obtained using a silica-containing washcoat applied to a monolith (e.g., mullite or silica honeycomb) support. Such ruthenium oxide-washcoated monolithic catalysts have exceptional thermal and chemical stability. As described in greater detail below, such a catalyst is suitably prepared through deposition of a silica powder as a thin film or washcoat onto the surface of the honeycomb support. After drying and calcination, a high surface area washcoat at the macropore surfaces of the ceramic honeycomb support is provided. The washcoat can be bound to the support through a film obtained by calcination of the sol slurry from which the washcoat is deposited. The high surface area generated in the washcoated support is preferred to provide thermal stability of the ruthenium oxide-containing active phase.

Washcoat

A washcoat is a thin, adherent coating of material disposed on the walls and/or surface of the support (e.g., the walls defining the foraminal cells or gas passages through a monolith support). Washcoats can increase the support surface area thereby resulting in highly dispersed deposition of the ruthenium oxide catalyst precursor and concomitant increased activity, thermal stability and chemical stability. Washcoats can likewise provide a highly porous support surface.

A washcoat is typically prepared as a slurry, solution or colloidal suspension ("sol") containing a high surface area material, such as silica, zirconia, tin oxide, such as stannic oxide ($SnO_2$), titania or the like, that is applied to the walls and/or surface of the support and then dried. Suitable washcoat materials include colloidal silica (for example, NYACOL 1440 colloidal silica), zirconyl chloride ($ZrOCl_2$), zirconium oxide colloids (such as 50 nm and 100 nm colloids available from Nyacol), and the powders, as described in U.S. Pat. No. 5,264,200, and listed in Table II, below.

TABLE II

| Sample Code | Surface Area ($m^2/g$) | Pore Volume ($cm^3/g$) | Pore Diameter[a] (Å) | Particle Size (μm) |
| --- | --- | --- | --- | --- |
| Syloid 74 | 350 | 1.1 | 126 | 4 |
| Sylox 15 | 250 | 1.6 | 256 | 10-12 |
| Grade 955[b] (Ultrafines SMR 7-6759) | 300 | 1.65 | 220 | 12.6 |
| Grade 56[c] (Milled 325 mesh SMR 7-6759) | 300 | 1.2 | 160 | <20 |

TABLE II-continued

| Sample Code | Surface Area (m²/g) | Pore Volume (cm³/g) | Pore Diameter[a] (Å) | Particle Size (μm) |
|---|---|---|---|---|
| Sylodent 700 | 700 | 0.6 | 34 | <20 |
| Grade 710[d] (SMR 22-213) | 480 | 0.75 | 63 | 4-20 |
| LZ-Y20 (H-ULY[e]) | 600 | 0.48[f] | 7.4 | 1-2 |

[a]Pore Diameter in Angstroms = (40,000) (Pore Volume cm³/g)/(Surface Area m²/g)
[b]Similar to grade 952 with grade 952 reported here.
[c]Properties cited for 103 μm powder (average particle size).
[d]Davisil Grade 710.
[e]Designated as the hydrogen form of ultrastable Y zeolite (H-ULY).
[f]Reported void volume in cm³/cm³.

After application to the support, the washcoat is preferably calcined, causing the silica or other high surface area material to become tightly bound to the wall surfaces of the support. The result is a support coated with silicon oxide, zirconium oxide, titanium oxide, tin oxide, aluminum oxide, or a combination thereof to yield a support comprising, for example in the case of a silica support, $SiO_2$—$SiO_2$, $ZrO_2$—$SiO_2$, $TiO_2$—$SiO_2$, $SnO_2$—$SiO_2$ and/or $Al_2O_5$—$SiO_2$.

In the case of a monolith support, application of the washcoat preparation to the walls of the support is preferably effected by dipping the support in the preparation. An optimum slurry concentration is that which affords maximum uptake of high surface area washcoat material per dip coating cycle, the cycle typically comprising dipping of the support in the preparation and release of the washcoat slurry from the honeycomb channels as assisted by a gas stream passing through the channels. Preferably, washcoat slurries, solutions and colloidal suspensions or sols comprise from about 5 wt % to about 25 wt %, more preferably from about 10 wt % to about 25 wt % solids. To increase the loading, the dip coating cycle may be repeated as necessary. A brief drying period in air at room temperature or elevated temperature (e.g., about 100° C.) can be done between dip coats. After the wet washcoat has been built up to the desired level by repetitive dip coating, the coated monolith support is typically dried, conveniently at about 100° C. to about 200° C. in a forced air oven and preferably calcined at from about 400° C. to about 800° C., more preferably from about 400° C. to about 600° C. and even more preferably from about 400° C. to about 550° C.

In one embodiment, an effective washcoat composition, in terms of adhesion to the underlying monolithic support, is provided by including a film forming agent such as a sol comprising silica, zirconia, tin oxide (e.g., $SnO_2$), titania or mixtures thereof in the washcoat. Based on experimental evidence to date, and without being bound to any particular theory, it is believed that adhesion based on linkages such as —O—Si—O— are stable toward sulfuric acid. It is further believed that linkages formed from sols are based on —O—Si—O— and therefore provide enhanced stability in the presence of sulfuric acid. Silica sols suitable for use as a washcoat component of this invention may be prepared by various methods known to the art. A silica sol suitable for application of a washcoat may be derived, for example, from a siloxane such as partially hydrolyzed tetraethylorthosilicate, $Si(OC_2H_5)_4$ (TEOS), as described by S. Sakka, K. Kamiya, K. Makita and Y. Yamamoto in the Journal of Non-Crystalline Solids, 63, 223-235 (1984) and incorporated herein by reference. In the particular method described therein, water, ethanol, and TEOS are combined in the molar ratios of 8:4:1 with acid added as $HNO_3$ such that the acid concentration is 0.01 M. Zirconium sols suitable for application of a washcoat include $ZrOCl_2$ and NYACOL Zr 10/20 and NYACOL Zircon.

Washcoat preparations comprising a sol can be made by forming a slurry containing: (1) a high surface area silica, for example SYLOX 15, in a concentration of from about 5 wt % to about 30 wt %, more preferably from about 5 wt % to about 25 wt % and still more preferably from about 5 wt % to about 20 wt % and yet more preferably from about 10 wt % to about 20 wt %; (2) a sol, for example TEOS or colloidal silica, in a concentration of from about 5 wt % to about 50 wt %, more preferably from about 10 wt % to about 45 wt % and still more preferably from about 10 wt % to about 40 wt %; (3) about 0.01 wt % to about 0.5 wt % of a mineral acid, for example nitric acid ($HNO_3$); and (4) the remainder comprising water and a water soluble solvent, such as a lower alcohol, wherein the ratio of water to the water soluble solvent is from about 2:1 to about 1:2. The sol may comprise additional optional components such as dispersion and wetting agents, for example, surfactants and dispersants. Those agents generally lower surface tension and improve coatability of the support to which the washcoat is applied. Suitable surfactants include nonionics, cationics, anionics and amphoterics. Nonionic surfactants are preferred with a suitable example being TRITON CF-32 (an amine polyglycol condensate available from Union Carbide).

The washcoat slurry containing a sol is then combined with a suitable support, such as a monolith and processed as described above. Upon drying and calcination, the dried washcoat sol provides a strong bond between the high surface area silica washcoat and the support through the formation of an adhesive film that leads to the formation of a high surface area washcoat tightly bound to the support. In the case of monoliths, after calcination, the washcoated finished support typically has an area of from about 15 m²/g to about 50 m²/g. The adhesive and high surface area properties lead to thermal stability of the ruthenium oxide-containing active phase that is produced in high dispersion on the washcoated support.

In a preferred embodiment for the preparation of a support for the ruthenium oxide-containing active phase, the support, preferably in the form of a monolith, is coated with a washcoat preparation comprising colloidal silica and microfluidized silica. The microfluidized silica forms the high surface area, porous coating and the colloidal silica serves as the adhesive sol to effectively bind the high surface area silica to the support.

Colloidal silica is generally characterized as comprising silica particles in the range from about 1 nm to about 1000 nm in their largest dimension. However, commercial colloidal silica products are typically available in substantially more uniform particle size distributions. Preferably, the colloidal silica comprises particles ranging from about 5 nm to about 100 nm, more preferably from about 10 nm to about 50 nm.

Microfluidized silica is generally characterized as comprising silica particles having an average particle size of about 10 μm. Commercial high surface area silica powder typically has a particle size of about 10 μm to about 20 μm, as dry particles. High surface area silica is commercially available from many sources, such as SYLOX 15 and SYLOID 74 from W. R. Grace and Company. It has been discovered that when high surface area silica is suspended in water, particle agglomeration can occur resulting in particles sizes of from about 10 μm to about 40 μm or larger. Thus, in one embodiment, the suspended, agglomerated high surface area silica particles are de-agglomerated or reduced in size using, for example, microfluidization, ball milling, and/or media milling techniques. Wet particle size reduction techniques are preferred because of greater simplicity in processing that fits well with the rest of the wet washcoating procedure.

In one wet particle size reduction method, microfluidized silica is prepared using a MICROFLUIZER high shear, high pressure fluid processor apparatus available from Microfluidics Corporation (Newton, Mass., USA). A slurry comprising agglomerated silica particles is fed through constrained passages in the apparatus at high pressure where the particles are agitated and sheared to the desired particle size. A microfluidized and largely monomodal particle size distribution of from about 1 μm to about 40 μm is typically obtained, preferably from about 5 μm to about 20 μm, and more preferably about 5 μm to about 15 μm.

High surface area silicas known in the art tend to produce thick, often agglomerated, suspensions in water having viscosities of from about 70 centipoise to about 80 centipoise at room temperature at a silica concentration of from about 15 wt % to about 20 wt %. Slurries having viscosity values in that range are generally less preferred for washcoating supports. By contrast, similarly formulated microfluidized silica suspensions used in the practice of the present invention having a reduced and predominantly monomodal particle size distribution also exhibit a reduced room temperature viscosity of less than about 50 centipoise, 40 centipoise, 30 centipoise, 20 centipoise, 10 centipoise or even less than about 5 centipoise, which renders such low viscosity suspensions particularly suited for use as a high surface area monolith support washcoating because of the easier access to support pores and cells or channels without aggregation. Furthermore, conventional sols containing colloidal silica generally require an aqueous carrier system further comprising a flammable organic solvent such as methyl or ethyl alcohol in order to reduce viscosity sufficiently to obtain a homogeneous deposition of the sol onto the support. However, use of microfluidized silica in combination with colloidal silica in accordance with the present invention provides a washcoat preparation having a viscosity low enough to enable elimination of the organic solvent from the aqueous carrier. Advantageously, elimination of flammable solvents from the aqueous carrier reduces volatile organic compound (VOC) fugitive emissions and results in capital equipment avoidance associated with Class II electrical codes and VOC fugitive emission containment equipment.

The microfluidized and colloidal silica washcoat preparation is made by combining an aqueous microfluidized silica slurry with an aqueous colloidal silica suspension. The microfluidized silica slurry typically comprises from about 5 wt % to about 30 wt %, preferably from about 5 wt % to about 25 wt % and more preferably from about 5 wt % to about 20 wt % silica and the colloidal silica suspension typically comprises from about 10 wt % to about 50 wt %, preferably from about 15 wt % to about 45 wt % and more preferably from about 20 wt % to about 40 wt % silica. The weight ratio of microfluidized silica to colloidal silica in the washcoat preparation is typically from about 2:1 to about 1:2, with a ratio of from about 1:1 to about 1:1.5 generally preferred. The washcoat preparation may contain additional optional components such as nonionic surfactants, for example, Triton CF-32, Triton X-102 or Triton 770.

Supports, such as monoliths, are typically coated with the microfluidized and colloidal silica preparation by dip coating followed by drying at a temperature of from about 100° C. to about 200° C. As discussed above, multiple coating and drying steps can be done in succession to obtain the desired loading. The coated support is then preferably calcined at a temperature of from about 400° C. to about 800° C., more preferably from about 400° C. to about 600° C. and even more preferably from about 400° C. to about 550° C. to generate the sol-based bond between the support and the high surface area microfluidized silica.

In one embodiment, the calcined support having the high surface area microfluidized silica thereon can be optionally subjected to a second washcoating process where, for example, zirconyl chloride ($ZrOCl_2$) or a zirconium oxide colloid (such as 50 nm and 100 nm colloids available from Nyacol) is deposited onto the surfaces of the support.

Formation of the Supported Ruthenium Oxide Active Phase

Precursors of the supported catalysts of the present invention can be prepared by combining or contacting a support, optionally having a washcoat layer thereon, with a solution of a ruthenium oxide precursor compound, followed by a precipitation step in which a ruthenium oxide catalyst precursor solid, preferably comprising amorphous ruthenium oxide hydrate, is precipitated onto the surfaces of the support. After optionally drying, the catalyst precursor may then be activated to form the ruthenium oxide-containing active phase by heating in a suitable oxidizing atmosphere comprising oxygen and/or $SO_2$.

In an alternative embodiment, supported catalyst precursors may be prepared by combining or contacting (e.g., soaking) the support with a solution of a ruthenium oxide precursor compound, preferably comprising a ruthenium salt, such as ruthenium chloride or ruthenium nitrosyl nitrate, or a trinuclear ruthenium carboxylate species, such as $\mu_3$-oxohexakis($\mu$-acetato)triaquatriruthenium acetate ($Ru_3O(O_2CCH_3)_6(H_2O)_3(CH_3CO_2)$), thereby coating or wetting the support and loading the support with the precursor compound from the solution. In this embodiment, rather than precipitating a ruthenium oxide catalyst precursor from the precursor solution onto the surfaces of the catalyst support, the catalyst support, loaded with a ruthenium oxide precursor compound is separated from the precursor solution and subjected to further processing to form the ruthenium oxide-containing active phase. After optionally drying, ruthenium metal of the catalyst precursor loaded on the support is converted to form the ruthenium oxide-containing active phase by heating in a suitable oxidizing atmosphere comprising oxygen and/or $SO_2$. In this embodiment, the precursor solution may further comprise an acid, such as sulfuric acid, such that the catalyst precursor is converted to a ruthenium oxide hydrate by heating in an atmosphere comprising humid air and/or air and steam, and an active phase comprising anhydrous ruthenium oxide is formed in a subsequent heating step. It is believed, without being bound to any particular theory, that when an aqueous solution of a ruthenium oxide precursor compound, such as $\mu_3$-oxohexakis($\mu$-acetato)triaquatriruthenium acetate, is prepared in the presence of sulfuric acid, the predominant species in solution becomes $Ru_3O(O_2CCH_3)_6(H_2O)_3^+$ because the acetic ligand is protonated as acetic acid. By soaking a support in the $Ru_3O(O_2CCH_3)_6(H_2O)_3^+$ followed by drying, the supported ruthenium complex is distributed evenly throughout the support pores. After drying in air (e.g., at a temperature of about 100-140° C.), the sulfate salt, $[Ru_3O(O_2CCH_3)_6(H_2O)_3]_2SO_4$, forms on the support. Upon heating in humid air or an air-steam mixture (e.g., at temperature of from about 200° C. to about 250° C.), the acetate ligands are gradually evolved as acetic acid ($H_2O+O_2CCH_3 \rightarrow HO_2CCH_3+OH^-$). The remaining "hydroxide" ligand is formed six times for each tri-nuclear complex leading to a $Ru_3O(OH)_6^+$ species. It is believed that agglomeration on the silica support of the tri-nuclear species leads to an extended array of nominally hydrous ruthenium oxide species ($RuO_2 \cdot xH_2O$). Once that species is heated (e.g., to a temperature above about 350-400° C.), the hydrous ruthenium oxide converts to anhydrous $RuO_2$ and the $SO_4$ forms $H_2SO4$ that vaporizes to a gas ($H_2O+SO_3$).

Suitable ruthenium oxide precursor compound solutions for use in forming the supported catalyst precursors are generally described herein above and are prepared by dissolving a ruthenium oxide precursor compound in a solvent to a concentration of from about 0.01 molar to about 5 molar, as calculated on a ruthenium effective unit basis. Optimum precursor solution concentrations depend on the surface area and porosity of the support and can be readily determined. When the support is other than a monolith (e.g., honeycomb) support, such as a saddle or ring, ruthenium oxide precursor solution concentrations are generally from about 0.01 molar to about 2 molar, preferably from about 0.01 molar to about 1 molar, and often from about 0.05 to 1 molar, as calculated on a ruthenium effective unit basis. When the support is in the form of a monolith, the concentration of the ruthenium oxide precursor compound in the solution is generally somewhat higher, typically from about 0.1 molar to about 5 molar, preferably from about 1.0 molar to about 3 molar, as calculated on a ruthenium effective unit basis.

The ruthenium oxide precursor compound solution is contacted or combined with and thereby loaded onto and/or into the catalyst support using any one of several suitable methods. As described above, the support can be, for example, a powder, granule or other shape adapted for use in fixed or packed bed catalyst arrangements or a monolith and can optionally comprise a washcoat layer. In one embodiment, a support capable of forming a slurry or suspension, such as a powder or granule, is first combined with a liquid to provide a slurry having a support concentration of from about 1% w/w to about 30% w/w, preferably from about 2% w/w to about 20% w/w. An aqueous slurry system comprising water is preferred. The support slurry and solution of the ruthenium oxide precursor compound are then combined. Alternatively, a powder or similar type of support may be combined directly with the ruthenium oxide precursor compound solution to form a slurry or suspension. The preferred support concentration in the slurry formed is from about 5% w/w to about 20% w/w, more preferably from about 10% w/w to about 15% w/w. Suitable slurry or suspension formation techniques are lnown to those skilled in the art and include, for example, agitation, wet milling, inversion, shaking, and combinations thereof. The loaded support can optionally be separated from the ruthenium oxide precursor compound solution to give a wet loaded support.

In another embodiment, monolith supports such a honeycombs and larger shaped catalyst supports such as rings and saddles, optionally having a washcoat thereon, can be immersed in the ruthenium oxide precursor compound solution (e.g., soaked or dip coated) to load the support. Regardless of the type of support employed, the manner and sequence by which the support and the precursor solution are combined or contacted are not narrowly critical and the support, or support slurry or suspension thereof, can be added to the ruthenium oxide precursor compound solution or vice versa. Moreover, the support can be contacted or loaded with the ruthenium oxide precursor compound solution multiple times to achieve the desired loading. For example, a monolith support may be subjected to multiple sequential immersions in the precursor solution. In the case of more porous supports, the supports remain immersed, slurried or otherwise in contact with the ruthenium oxide precursor compound solution for a period of time sufficient to allow substantially homogenous coating, absorption and penetration of the precursor solution onto the surfaces of the support and into the support pores. Support contact or immersion times may vary significantly with the surface area and porosity of the support and desired penetration depth, and are typically at least about 1 hour, 2 hours, 3 hours, 4 hours, 5 hours, 6 hours, and up to about 24 hours or more.

As noted above, in one embodiment, formation of a supported ruthenium oxide active phase includes precipitating a ruthenium oxide catalyst precursor solid, preferably comprising ruthenium oxide hydrate, from the precursor solution onto the surfaces of the catalyst support. Suitable precipitation techniques are described herein above and include heating and/or pH adjustment of the precursor solution in contact with the support. As described above in connection with the preparation of an unsupported ruthenium oxide active phase, precipitation of ruthenium oxide hydrate precursors generally provide ruthenium oxide catalysts possessing improved chemical and thermal stability. In the case of supported catalysts, the precipitated ruthenium oxide hydrate precursors provide strong bonds with the underlying support or washcoat layer to enhance stability of the catalyst.

Precipitation of a ruthenium oxide hydrate precursor by heating the precursor solution may be utilized when the support is contacted with the precursor solution as a slurry or suspension containing the support or by dipping a monolith support in the precursor solution. A solvent or solvent system comprising water is preferred. The precursor solution in contact with the support is generally heated to a temperature of from about 70° C. to about 95° C., thereby resulting in precipitation of amorphous ruthenium oxide hydrate onto and/or within the structure of the support. Preferably, the precursor solution in contact with a support capable of forming a slurry or suspension is agitated during the heating process. As described herein above, the heating rate is preferably controlled in order to provide a continuous and even precipitation of a highly dispersed, amorphous, small particle size ruthenium oxide hydrate catalyst precursor solid. Generally, rapid heating should be avoided to prevent localized, inhomogeneous, precipitation. Some ruthenium precursor compound solutions, such as ruthenium chloride, are acidic and have pH values of about 1 or lower. After heat precipitation, the pH of the ruthenium precursor compound solutions can be adjusted with a suitable base such as ammonia gas, ammonium hydroxide, sodium hydroxide or potassium hydroxide.

Precipitation of a ruthenium oxide hydrate precursor by pH adjustment of the precursor solution may be utilized when the support is contacted with the precursor solution as a slurry or suspension containing the support, by dipping a monolith support in the precursor solution, or when the loaded support has been separated from the ruthenium oxide precursor compound solution. An acidic aqueous precursor solution can be treated with a suitable base to effect neutralization (i.e., raise the pH) and precipitation of amorphous ruthenium oxide hydrate onto and/or into the structure of the support. As described above, the base used can be solid, liquid or gas and preferably is selected from ammonia, ammonium hydroxide, sodium hydroxide and potassium hydroxide. In the case of basic solutions used for pH adjustment, the solutions preferably have a base concentration in excess of about 5 w/v %, more preferably at least 10 w/v %, 15 w/v %, 20 w/v % or even 25 w/v % percent. The base and the ruthenium oxide precursor compound solution in contact with the support can be combined using any order of addition. For example, the ruthenium oxide precursor compound solution and support may be added slowly to a concentrated base solution (e.g., an ammonium hydroxide solution) with agitation over an extended period of time, for example, over a period of at least about 15 minutes, about 30 minutes, about 45 minutes, about 60 minutes or longer. Agitation of the slurry is continued after completion of the addition of the precursor solution for at least about 15 minutes, about 30 minutes, about 45 minutes, about 60 minutes, about 75 minutes, about 90 minutes or longer to ensure precipitation of a homogeneous ruthenium oxide hydrate catalyst precursor. The temperature is preferably maintained below boiling or reflux during precipitation, preferably from about 20° C. to about 95° C. In another embodiment, a concentrated base solution is added to the ruthenium oxide precursor compound solution in contact with the support. In yet another process option, an acidic mixture of a ruthenium oxide catalyst precursor compound solution and a catalyst support can be adjusted to the neutral or basic range by the addition of a gaseous base, such as ammonia. Gaseous base is preferred in cases where gas addition is advantageous, such as coupling base addition with a dewatering unit operation. In yet another process option, the loaded substrate can be collected as wet or dry solid that is subsequently treated with ammonia gas thereby converting the ruthenium precursor compound to amorphous ruthenium oxide hydrate. Optionally, a basic solution can then be passed over the catalyst.

After precipitation of the ruthenium oxide precursor solid onto the catalyst support, the loaded catalyst precursor is isolated from the precipitation mixture, optionally washed, and then dried. At least a portion of the dried catalyst precursor may be in the form of an agglomerate resulting in a non-uniform particle size distribution. In that case, the agglomerates may be broken up in order to obtain a more homogeneous catalyst particle size distribution and thereby optimize physical properties such as flowing, packing and packed void volume, as well as catalytic activity. Particle size reduction methods known in the art such as milling (e.g., ball mills, hammer mills, rotary mills, tumbling mills, vibratory mills or jet mills) are suitable for de-agglomeration and particle size reduction. The catalyst precursor may then be separated according to particle size by, for example, sieving or classification.

The supported ruthenium oxide catalyst precursor is activated by calcining in an oxidizing gas to convert the precursor and form the ruthenium oxide-containing active phase having the desired properties of crystallite size, activity, chemical stability and thermal stability. Calcination, as described above, is generally conducted at a temperature of from about 200° C. to about 600° C., more preferably from about 300° C. to about 500° C., for between about 0.5 and about 12 hours in an atmosphere comprising oxygen and/or $SO_2$. Calcination of the supported ruthenium oxide catalyst precursor can optionally be achieved using protocols comprising multiple stages at different temperatures with ramped heating between stages.

Regardless of whether the supported catalyst precursor is formed using a precipitation or wetting deposition technique, the loaded support can optionally be subjected to a reductive treatment as described above (e.g., by heating in a reducing atmosphere or contacting a reducing agent such as a solution of sodium borohydride in a liquid-phase treatment), in order to favor the formation of well dispersed, mechanically adherent ruthenium metal crystallites that when exposed to an oxidizing atmosphere at elevated temperatures convert to a ruthenium oxide catalyst effective for $SO_2$ oxidation. Such reductive treatment converts a substantial fraction of the ruthenium present on the loaded support to ruthenium metal and thereby produces a supported catalyst precursor comprising ruthenium metal. As noted above, reductive treatment and the attendant benefits with respect to ruthenium oxide crystallite size, catalytic activity and/or catalyst life, appears to be dependent upon the ruthenium oxide precursor compound utilized to form the catalyst precursor and, in particular, is beneficial when the ruthenium oxide precursor solid is formed using a ruthenium salt such as ruthenium chloride or ruthenium nitrosyl nitrate. In embodiments where other ruthenium oxide precursor compounds are utilized (e.g., where a supported catalyst precursor is formed by wetting the support with a solution of a tri-nuclear ruthenium carboxylate species), reductive treatment is unnecessary and may have adverse effects on catalyst performance. Following any reductive treatment, the ruthenium metal of the catalyst precursor is converted to ruthenium oxide to form the ruthenium oxide-containing active phase by heating in a suitable oxidizing atmosphere comprising oxygen and/or $SO_2$ as described of. Optionally, heating of the loaded support in a reducing atmosphere and heating in an oxidizing atmosphere can be combined in a heat treatment protocol to both reduce the deposited ruthenium oxide precursor compound to ruthenium metal and form the ruthenium oxide-containing active phase.

Promoters

Promoters may be included in the ruthenium oxide-containing catalyst compositions of the present invention. Promoters are believed to act to reduce ruthenium crystallite size and thereby enhance catalytic activity and stability. Under one theory, and without being bound to any particular theory, it is believed that the basicity of certain promoter metals favors the formation of ruthenium hydrate which is further believed to favor the formation of stable ruthenium dioxide having reduced crystallite size. Those metals may also act as promoters, or catalytic activity synergists, and increase catalytic activity thereby enabling lower ruthenium loadings.

Promoter metals having a valence of +4 or +3 are preferred, more preferably promoter metals having a valence of +4. Suitable promoter metals include zirconium, tin, titanium, hafnium, lead, cerium, tellurium, thorium, uranium, aluminum and lanthanum. Promoters are generally present as oxides formed from a water soluble metal salt and include $ZrO_2$, $SnO_2$, $TiO_2$, $HfO_2$, $PbO_2$, $CeO_2$, $TeO_2$, $ThO_2$, $UO_2$, $Al_2O_3$ and $La_2O_3$ and mixtures thereof. Zirconia and tin oxide (e.g., $SnO_2$) are particularly preferred. Any soluble salt of the promoter metal is suitable for use in the preparation of catalyst of the present invention, for example, oxides, hydroxide, halides, halogeno-acids, oxy acids, salts of inorganic acids, and coordination complexes such as tetrammine halides. Preferred promoter metal compounds generally have a solubility in water of at least about 10% weight per volume, more preferably at least about 25% weight per volume, and still more preferably at least about 50% weight per volume at a pH of less than about 3, for example 2, or even 1. Suitable water-soluble zirconium compounds include zirconium hydroxide ($Zr(OH)_4$), zirconyl chloride ($ZrOCl_2$), zirconyl nitrate ($ZrO(NO_3)_2$), zirconium sulfate ($Zr(SO_4)_2$), zirconyl acetate ($Zr(OH)_2(C_2H_3O_2)_2$) and their hydrates. Suitable water-soluble tin compounds include stannic oxide ($SnO_2$), stannous chloride ($SnCl_2$), stannous sulfate ($SnSO_4$) and their hydrates.

Weight ratios of ruthenium oxide to the promoter (as an oxide) in the catalyst is generally from about 10:1 to about 1:10, preferably from about 5:1 to about 1:10, from about 4:1 to about 1:10, from about 3:1 to about 1:10, from about 2:1 to about 1:10, or from about 1:1 to about 1:10.

The promoter metal can be incorporated into the ruthenium oxide catalyst in the support, as a washcoat and/or as a component of the ruthenium oxide-containing active phase.

In one embodiment, a catalyst support can be impregnated with a promoter metal solution having a concentration of, for example, from about 0.1 molar to about 10 molar, from about 0.5 molar to about 5 molar, or from about 1 molar to about 3 molar. The promoter metal solution is combined or contacted with a catalyst support for a time sufficient for the solution to permeate the support. The promoter-support is then isolated and, if required, a pH neutralization can be done. For instance, a catalyst support can be combined with a 1 to 3 molar solution of $ZrOCl_2.8H_2O$, followed by a nitrogen purge to remove excess solution and an ammonia purge to neutralize the pH. In the case of promoters having reduced solubility at elevated pH, promoter metal adsorption into and/or precipitation onto the support as a layer or film can be enhanced by raising the pH by the addition of a base. Preferred bases include ammonia, ammonium hydroxide, sodium hydroxide and potassium hydroxide.

In another embodiment, the promoter metal can be co-applied onto a support with or as a component of a washcoat preparation. In this embodiment, a promoter solution (as described herein above) is prepared. The promoter solution is then combined with a washcoat slurry, such as a high surface area silica. The promoter-washcoat is then applied to the support to yield a high surface area coating comprising the promoter metal evenly distributed therein.

In yet another embodiment, the promoter metal may be applied over the surface of a washcoated support (e.g., as a top coat). In this embodiment, a 0.1 molar to 10 molar solution, a 0.5 molar to 5 molar solution, or a 1 molar to 3 molar solution of the promoter is prepared. The promoter solution is combined or contacted with a washcoated support and held for a time sufficient for the solution to permeate the porous washcoat layer. If required, a pH neutralization can be carried out.

In still another embodiment, a promoter solution (as described herein above) can be combined with a ruthenium precursor compound solution (as described herein above) and applied to a support or a washcoated support. Alternatively, the promoter metal compound can be dissolved in the solution of the ruthenium oxide precursor compound. In this embodiment, the promoter and ruthenium are then co-precipitated or otherwise co-applied onto the surface of the support or a washcoated support.

Use of the Ruthenium Oxide Catalyst

The ruthenium oxide catalysts in accordance with the present invention are generally useful in processes for the catalytic oxidation of $SO_2$ to $SO_3$. Such processes comprise contacting a feed gas mixture comprising $SO_2$ and oxygen with the ruthenium oxide catalyst described herein to produce a conversion gas comprising $SO_3$. The ruthenium oxide catalysts described herein are particularly suited for oxidation of $SO_2$ in a feed gas mixture having an $SO_2$ gas strength of no more than about 2%, preferably no more than about 1.5%, and even more preferably no more than about 1%, 0.9%, 0.8%, 0.7% or less. Preferably, the temperature of the $SO_2$-containing feed gas mixture and the $SO_2$ gas strength are such that feed gas mixture is contacted with the ruthenium oxide catalyst at a temperature no greater than about 400° C., more preferably from about 300° C. to about 400° C., more preferably from about 325° C. to about 400° C., and even more preferably from about 350° C. to about 375° C. In one particular embodiment, the catalytic conversion of $SO_2$ to $SO_3$ using the ruthenium oxide catalyst is part of a process for the manufacture of sulfuric acid by the contact process. However, the ruthenium oxide catalysts of the present invention are generally useful in any application requiring the catalytic oxidation of $SO_2$ to $SO_3$, particularly in feed gas mixtures having low $SO_2$ gas concentrations and where low temperature catalytic oxidation is desired.

Sulfuric acid and/or oleum manufacturing processes known in the art typically comprise combustion of a source of sulfur with an oxygen-containing gas in a burner to produce a combustion gas stream or feed gas mixture comprising $SO_2$ and oxygen, passage of the gas stream through a converter comprising a plurality of catalyst stages or passes for progressive conversion of $SO_2$ to $SO_3$, recovery of the exothermic heat of conversion in useful form by cooling the gas stream exiting the catalyst stages, and passage of the cooled gas stream from at least one of the stages through an absorption zone where the gas stream is contacted with aqueous sulfuric acid for removal of $SO_3$ from the gas phase to produce the sulfuric acid and/or oleum product. In an interpass absorption design utilizing a catalytic converter with four stages, $SO_3$ is removed from the gas stream through a sulfuric acid irrigated absorption tower that follows the second catalytic stage (2:2 IPA design) or third catalytic stage (3:1 IPA design) of the converter and the gas stream from the interpass absorption zone is returned to a further stage of the plurality of catalyst stages prior to passage through a final absorption stage. Catalysts comprising platinum or alkali-vanadium active phases may be employed in some of the catalytic stages. The gas entering the last catalytic stage of the converter typically has a low $SO_2$ gas strength and has a temperature in a range of from about 360° C. to about 415° C.

FIG. 1 depicts the flow sheet for a conventional contact sulfuric acid manufacturing process, including interpass absorption, representative of a typical commercial embodiment in which the ruthenium oxide catalyst of the present invention may advantageously be used. Undried combustion air is drawn into the system through a filter 111A and dryer 111B and a compressor 113. The temperature of the combustion air is increased by passage through an air preheater comprising an indirect heat exchanger 115 in which the air is indirectly heated, for example, by transfer of heat from heat recovery tower discharge absorption acid. The heated air is used to burn sulfur or other sulfur source in sulfur burner 101. Thus, the transfer of heat in the air preheater contributes heat to the combustion gas exiting burner 101. Alternatively, a $SO_2$ stream may be derived from such sources as the roasting step of a metal recovery operation, the reference herein to burning or combustion of a sulfur source being intended to include such roasting operations or any other process in which a sulfur source is oxidized to produce a $SO_2$-containing gas from which sulfuric acid can be produced. Although the process depicted in FIG. 1 includes a dryer for the combustion air, it should be understood that the catalyst of the present invention may be utilized in a wet gas contact sulfuric acid plant in which the $SO_2$-containing combustion gas formed using undried combustion air and comprising appreciable concentrations of water vapor is fed to the converter as described, for example, in U.S. Pat. No. 5,130,112, the entire contents of which are incorporated herein by reference.

The combustion gas exiting the burner is passed through a waste heat recovery unit 117, preferably a steam boiler, where heat is transferred from the combustion gas to a heat transfer fluid, such as boiler feed water or steam. Typically, the combustion gas enters the waste heat boiler at a temperature of about 1160° C. and leaves at a temperature above the dew point. Steam is preferably generated at a pressure of at least about 25 bar gauge, normally in the range of 40 to 60 bar gauge. In the flow sheet illustrated, superheat is imparted to the steam generated in the waste heat boiler by passing the steam through superheaters comprising indirect heat exchangers 121, in which heat is transferred to the steam from $SO_3$-containing conversion gas generated in a catalytic converter 103.

$SO_2$ in the combustion gas is converted to $SO_3$ in converter 103 comprising first 123, second 125, third 127 and fourth 129 catalytic stages. In this interpass design, gas from the third catalyst stage of the converter is directed to a heat recovery absorption tower 105. Absorption is carried out at high temperature in the heat recovery tower, producing sulfuric acid and generating the heat of absorption. Exit gas from the heat recovery absorption tower is directed back to the converter 103 where residual $SO_2$ is converted to $SO_3$ in the fourth (i.e., final) catalytic stage 129. Gas from the final converter stage is directed to a final absorption tower 109 where additional sulfuric acid is produced. Gas leaving the final absorption tower is exhausted from the system through a stack 131.

Combustion gas exiting the waste heat recovery unit 117, typically containing from about 4% to about 15% $SO_2$ along with a source of oxygen (i.e., converter feed gas mixture), enters the converter 103 and passes, in order, over the first three catalyst stages 123, 125 and 127, respectively, wherein about 94% to about 95% of the $SO_2$ is converted to $SO_3$ using a catalyst comprising, for example, a platinum or alkali-vanadium active phase. If a sufficient excess of combustion air or other oxygen-containing gas is not fed to the sulfur burner 101, additional air or other oxygen-containing gas may be mixed with the combustion gas to form the converter feed gas mixture. More particularly, gas exiting the waste heat recovery unit 117 enters the first catalyst stage 123 of converter 103. Conversion of $SO_2$ to $SO_3$ in stage 123 generates substantial exothermic energy, at least a portion of which is recovered in superheater 121 in which heat is transferred from the conversion gas to the steam generated in waste heat recovery unit 117 as superheat. Conversion gas exiting superheater 121 enters second catalyst stage 125 of the converter, in which additional $SO_2$ is converted to $SO_3$. As shown in FIG. 1, the hot gas leaving the second catalyst stage is cooled in superheater 121, or alternatively may be cooled by transfer of heat to gas returning to the fourth catalytic stage of the converter from heat recovery absorption tower 105 in a "hot" heat exchanger comprising an indirect heat exchanger. Cooled second stage conversion gas passes through third catalyst stage 127 for further conversion of $SO_2$ to $SO_3$. Heat contained in the gas exiting third stage 127 is recovered in indirect heat exchanger 107.

Sulfuric acid exiting the heat recovery absorption tower 105 flows to a circulating pump and ultimately is discharged as a sulfuric acid product stream containing a major proportion of the sulfuric acid produced. Gas exiting absorption tower 105 first passes through a mist eliminator within tower 105 and then exits the tower returning to the converter for further conversion of $SO_2$ in the fourth stage feed gas to produce a conversion gas comprising $SO_3$ in the final catalyst stage 129. The final stage can be operated essentially isothermally with a temperature of not greater than about 375° C., or adiabatically with a maximum temperature of the fourth stage gas in contact with the catalyst preferably not exceeding about 400° C.

Final stage feed gas typically comprises no more than about 5%, 4.5%, 4%, 3.5%, 3%, 2.5%, 2%, 1.5%, 1%, 0.9%, 0.8%, 0.7% or less $SO_2$. Conversion of at least 75%, 80%, 85%, 90%, 95%, 99%, 99.5%, 99.6%, 99.7%, 99.8% and even 99.9% or more of the $SO_2$ to $SO_3$ can be achieved using the ruthenium oxide catalyst of the present invention in the final catalytic stage 129 at conversion temperatures preferably not greater than about 400° C., for example, from about 300° C. to about 400° C., from about 325° C. to about 400° C., or even from about 350° C. to about 375° C. Conversion gas $SO_2$ concentrations exiting the final catalyst stage of less than about 500 ppmv, about 400 ppmv, about 300 ppmv, about 200 ppmv, about 100 ppmv, about 90 ppmv, about 80 ppmv, about 70 ppmv, about 60 ppmv, about 50 ppmv, about 40 ppmv, about 30 ppmv, about 20 ppmv, or even about 10 ppmv can be readily achieved. Because of the favorable relationship between conversion rates and pressure drop, in one preferred embodiment, the ruthenium oxide catalyst of the present invention used in the final catalytic stage 129 of converter 103 is in the form of a monolithic catalyst as described herein. Use of the monolithic ruthenium oxide catalyst of the present invention allows the gas velocity through the final catalytic stage to be substantially higher, and thus the diameter of the converter (with respect to the final catalyst stage or all of the catalyst stages if monolithic catalysts are employed therein) to be substantially smaller.

In one embodiment, the fourth catalytic stage 129 is operated adiabatically. In such an embodiment, the heat and $SO_2$ content of the fourth stage feed gas are preferably such that the exothermic heat of reaction from conversion of $SO_2$ to $SO_3$ does not increase the temperature of the gas in contact with the oxidation catalyst above about 400° C., or even about 375° C.

It has been discovered that use of the ruthenium oxide catalysts of the present invention in the final catalyst stage 129 produces $SO_2$ conversions of at least about 99.7% of the first stage 123 inlet $SO_2$ concentration at lower catalyst loading than fourth stage catalysts known in the art. In particular, comparison of the data in Table 2 (below) indicates that various embodiments of the ruthenium oxide catalyst disclosed herein achieve greater $SO_2$ conversion as compared to the same weight of a comparative catalyst comprising cesium, potassium and vanadium. The higher conversion efficiency (i.e., activity) associated with the ruthenium oxide catalysts of the present invention enables smaller fourth stage catalyst beds (i.e., reduced catalyst loading) to be used to achieve the required fourth stage conversion thereby resulting in catalyst cost savings, increased gas velocity and reduced capital cost.

Fourth stage conversion gas exiting final catalyst stage 129 is directed to final absorption tower 109 through another heat exchanger 130. Absorption of residual $SO_3$ is carried out in final absorption tower 109 by countercurrent flow of sulfuric acid and the gas over a packed absorption zone. The tail gas exiting absorption tower 109 first passes through a mist eliminator within tower 109 and is exhausted from the system through stack 131.

EXAMPLES

The following examples are simply intended to further illustrate and explain the present invention. This invention, therefore, should not be limited to any of the details in these examples.

Experiments were undertaken to evaluate the preparation of and $SO_2$ to $SO_3$ conversion efficiency of ruthenium oxide catalysts.

In the examples that follow, several procedures are presented to prepare ruthenium-containing catalysts for the oxidation of $SO_2$ to $SO_3$. These catalysts may be unsupported or supported on acid-resistant supports such as zirconia, silica, and mixtures of zirconia and silica. Other promoter and stabilizer elements may be combined with the support. Ruthenium may be added to the support as an aqueous solution of ruthenium(III) trichloride hydrate or ruthenium nitrosyl nitrate hydrate wherein the water of hydration is determined through elemental analysis of the salt for ruthenium. The examples give different methods for "fixing" ruthenium on the catalyst including aqueous reduction in the presence of $Zr(OH)_4$, heating the $RuCl_3$ solution to 80 to 90° C. in the presence of shaped or powdered forms of $ZrO_2$ support, wetting the support with an aqueous $RuCl_3$ solution followed by treatment of the wet $RuCl_3$-support with anhydrous ammonia, and treatment of the dried $RuCl_3$-support with a hydrogen containing gas at 150° C. to 300° C. until HCl is substantially absent from the off gas. In the case of ruthenium nitrosyl nitrate, a dried $RuNO(NO_3)_3$-support is treated with a hydrogen containing gas at 150° C. to 300° C. until $HNO_3$ is substantially absent from the off gas. Further activation of these catalysts may include heating in either an air or $SO_2$ in air gas stream to about 350° C. before use as a catalyst. The catalysts were found to have high activity at low temperatures, particularly for weak $SO_2$-containing gas streams where both the %-$SO_2$ and the %-$O_2$ levels are low. It was determined that neither vanadium nor platinum active phases, typical of prior art catalysts, are particularly effective for high conversions of weak $SO_2$ gas streams at low inlet temperatures. The ruthenium oxide-containing catalysts presented in the following examples demonstrate high conversions at low temperatures.

Catalyst evaluation was done in a thermal catalyst aging tester (TCAT) reactor system. The TCAT reactor has eight quartz dip-tube style reactor tubes are arranged in a circular fashion in a common electric furnace, and is designed to test different catalyst samples under identical conditions for the oxidation of $SO_2$ at various inlet temperatures. Each reactor tube operated under closely isothermal conditions. For catalyst evaluation, a common feed gas supply was mixed and delivered at the same volumetric flow rate (100 standard cubic centimeters per minute (SCCM)) to each sample by means of individual mass flow controllers. The inlet and outlet gas samples were analyzed by a calibrated gas chromatographic procedure and the $SO_2$ conversion of the inlet gas stream was determined. That analysis was repeated for each catalyst sample at a given inlet temperature and thereafter the inlet temperature was increased by a specified amount to a new inlet temperature. The temperature was maintained at about 375° C. for about 24 hours after completion of a set of $SO_2$ conversions for the incremented inlet temperatures for all samples in their fresh states. That thermal treatment simulated a short break-in online period that catalysts typically experience in a converter at reaction conditions. The temperature was then lowered to the lowest fresh inlet temperature and the $SO_2$ conversions were again measured for all samples. The temperatures were again incremented to give the same set of initial temperatures used for the fresh sample cycle and the $SO_2$ conversions were again measured. When that cycle was complete for all samples, the "aged" cycle $SO_2$ conversions were compared to those in the fresh cycle. The most effectively thermally stabilized catalyst samples were those which showed the least decline in $SO_2$ conversions between the fresh and aged cycles at various inlet temperatures.

A gas chromatographic (GC) procedure was used to detect and quantify the sulfur dioxide and oxygen components of the inlet and outlet gas streams of TCAT and the integral reactor systems. An Agilent Model 200M, two-channel micro GC using helium as a carrier gas was used. Each of the reactor outlet gas samples plus the inlet sample was directed to the GC through an automated, multi-position sample selector valve (Valco Model 2CSC4MWP). Channel A of the two-channel analyzer was used for the separation and detection of oxygen and channel B for detection of sulfur dioxide. The sample being analyzed was split internally into two separate streams, one to channel A and one to channel B. Each channel was comprised of an inject valve, a chromatographic column and a thermal conductivity detector. The column for channel A ($O_2$) was an 8-meter long 5A molecular sieve. The column separated the $O_2$ from the $SO_2$ and $N_2$ at 60° C. and the $O_2$ and $N_2$ were then integrated with the $N_2$ used for an internal standard. The $SO_2$ was retained on the mole sieve column until the column temperature is raised to 150° C. An $O_2$ purge was done once a day (overnight). The column for channel B ($SO_2$) was a 4-meter long OV-1701 used to separate $SO_2$ from $N_2$ and $O_2$ at 45° C. The $SO_2$ and air ($O_2$ & $N_2$) were integrated and the air was used for an internal standard.

Ezchrom software (version 4.5) was used with a desktop PC to control the GC and integrate peak areas. The analyzer was calibrated using four levels of calibration gas. The four levels bracket the highest and lowest concentrations of $O_2$ and $SO_2$ that were expected for a given set of reaction conditions. The GC area data was input to a custom software program that calculated mole percent of each component and the percent conversion of $SO_2$. The data were then formatted and output as a final summary of all gas concentrations and reactor conversions. The custom software package also controlled the operation and timing of the multi-position sample selector valve.

Ruthenium and zirconium analysis was performed using an X-ray fluorescence (XRF) analysis procedure. Analysis was done using a Philips Minipal 2 spectrometer, model PW 4025 with 12-sample changer and helium purge system for the region between the energy source (9 watt power supply, voltage ranges from 1 to 4 kV and current ranges from 1 μA to 1 mA) and sample. For those applications, the power supply used a rhodium X-ray tube with 6 filters to absorb x-ray photons because the absorption was not uniform over the entire spectral range. Samples were pre-ground in a micromill for at least 1 minute, sieved through a 100-mesh screen, and the sieved powder loaded into a sample cup fitted with a 4-μm prolene film on one end and capped on the other before loading the sample cup in one position of the sample changer. Three applications were developed for analysis of the supported ruthenium catalysts operating all three at 30.0 kV, 8 μA, silver filter, and a measurement time of 300 seconds.

Catalyst samples containing Ru, Si, and Zr were analyzed against a set of standards. The standards set up a linear response of the counts per second of the Kα fluorescence lines of the element for analysis against the weight-% of the element across the range included in the standards. The measured standards were then linear least squares fit over the elemental weight-% range of interest. Table 1 shows the application name, the weight-% range for the element analyzed, the minimum and maximum in that range, and the linear least-squares correlation constant.

TABLE 1

| Application name | Element analyzed | Minimum element, wt.-% | Maximum element, wt.-% | Least-squares fit correlation constant |
|---|---|---|---|---|
| Ru on silica | Ru | 0.000 | 6.640 | 0.983 |
| Ru on zirconia | Ru | 0.000 | 5.410 | 0.991 |
| Ru—Zr on silica | Ru | 0.000 | 9.270 | 0.981 |
| Ru—Zr on silica | Zr | 0.000 | 7.700 | 0.994 |

Elemental analyses in weight-% in the examples that are higher than those given in the above table were determined through uptake weight measurements.

Surface area and pore volume measurements were performed by Porous Materials, Inc. (PMI), Ithaca, N.Y. using the Brunauer, Emmett, and Teller ("BET") method. The BET theory of physical adsorption was used to measure the single-point surfaces areas using the PMI BET Sorptometer, model # CBET 201-A. The results were reported as outgassed samples in units of $m^2$ per gram of sample or $m^2/g$. Mercury porosimetry data was collected using PMI Mercury/Nonmercury Porosimeter, model # AMP-60K-A-1_NM. Pore volumes were measured in units of cubic centimeters (cc) per gram, cc/g. Pore volume distributions were measured from about 29 pounds per square inch absolute (psia) up to about 60,000 psia corresponding to pore diameters from 7.3 µm down to about 0.0035 µm.

Crystallite size was measured using a powder X-ray diffraction (XRD) procedure. Finely powdered samples were pressed into sample cups with a Mylar film to hold the powder in the cup. The sample cup was mounted on a Scintag PAD II diffractometer system using CuKα radiation, a high purity germanium detector maintained at 77 K (liquid nitrogen temperature), and a single channel analyzer. The powder pattern was compared against powder diffraction files maintained by The International Centre for Diffraction Data® (ICDD®, http://www.icdd.com/). Materials with unique crystalline phases were assigned a "powder diffraction file" or PDF number. The pattern of the PDF materials was compared against the catalyst XRD pattern.

High-resolution analytical electron microscopy was performed at the Unit for Nanocharacterization at the Hebrew University of Jerusalem, Israel. Scanning transmission electron microscopy (STEM) was performed on a Tecnai F20 $G^2$ instrument (FEI Company, USA) operated at 200 kV and equipped with energy dispersive X-ray spectroscopy (EDS, using an EDAX-TSL instrument). The EDS was acquired in STEM mode. STEM imaging was performed with high angular annular dark field (HAADF) STEM detector highly effective for Z (atomic number)-contrast imaging.

Example 1

Comparative example 1 evaluated a prior art lower pass sulfuric acid catalyst containing a mixture of cesium, potassium, and vanadium salts on a diatomaceous earth support commercially available under the tradename SCX-2000 as sold by MECS, Inc. Typical analysis of this catalyst on a volatile free basis gave the following approximate active phase oxide composition: 11.4% $Cs_2O$; 8.5% $K_2O$; and 7.3% $V_2O_5$. That catalyst is representative of among the most active form of vanadium-based sulfuric acid catalyst commercially available. Extrudates of SCX-2000 were ground to give 2.1- to 2.4-µm granules for comparative testing in the TCAT reactor using 2.6 cc of granules that weighed 1.58 g. The % $SO_2$ conversion of a gas stream containing 0.5% $SO_2$ and 7% $O_2$ was evaluated in the TCAT reactor at various temperatures for catalyst 1 (granules of SCX-2000—fresh cycle) and 1A (granules of SCX-2000—aged cycle) with the results tabulated in Table 2.

Example 2

45.0 g of $Zr(OH)_4$ powder was suspended in 400.5 g of deionized water. To this slurry was added 11.9 g $RuCl_3*1.79H_2O$ dissolved in 55 g water. The slurry was heated to 84° C. over 19 min. After another 21 min., the slurry was filtered through #50 Whatman filter paper. A solid dark gray material was collected. The wet cake was stirred in about 350 ml water and brought up to 84° C. The pH of the slurry was <1 and was raised to pH 7.1 at 66° C. with concentrated $NH_4OH$. Over 59 min., 17.7 ml of 37% formaldehyde in 10 portions were added. The slurry was then cooled while stirring overnight. The slurry was reheated to 83° C. with stirring. The slurry was then collected by filtration on #50 Whatman filter paper. The wet cake was dried overnight in a vacuum oven at 120° C. A total of 42.6 g dried powder was recovered.

The dried powder was formed into wafers using 20 kpsi applied pressure. The wafers were broken and then sieved between 2.1- and 2.4-µm. The granules were then calcined in air in a muffle furnace at 200° C. for 2.5 hours and then the temperature was ramped up to 370 to 430° C. for over 90 min. Greenish-gray granules were obtained that weighed 7.00 g and, by X-ray fluorescence (XRF) analysis, 5.02% by weight Ru. A 2.6 cc portioned weighed 3.31 g. and was loaded into one of the thermal catalyst aging tester (TCAT) reactor tubes. The % $SO_2$ conversion of a gas stream containing 0.5% $SO_2$ and 7% $O_2$ was evaluated at various temperatures in the TCAT reactor for catalyst 2 (example 2 catalyst—fresh cycle) and 2A (example 2 catalyst—aged cycle) with the results tabulated in Table 2.

Example 3

Four grams of ⅛" zirconia pellets (Alfa Aesar #43815, typically 90 $m^2/g$ BET surface area) were immersed in an aqueous solution (about 25 ml) of 0.1M $RuCl_3*xH_2O$. The solution was heated to 80-90° C. to deposit a thin coating of hydrous ruthenium dioxide on surface of the zirconia pellets with no more than 100 µm penetration into the pellets of the hydrous ruthenium dioxide coating. The coated (1×) pellets were rinsed well with water then immersed in a second 25 ml aqueous solution of 0.1M $RuCl_3*xH_2O$. The solution was again heated to 80-90° C. to deposit a second thin (2×) coating of hydrous ruthenium dioxide on surface of the hydrous ruthenium dioxide (1×) coated zirconia pellets. After rinsing these pellets with water, the coating procedure was repeated to give 3× coated hydrous ruthenium dioxide on zirconia pellets.

The 3× coated pellets were suspended at room temperature in about 50 ml water. The 3× coated pellets were treated using an excess of about 0.2 g of $NaBH_4$ powder added directly to the water that immersed the 3× coated pellets. The coated pellets were swirled in the aqueous $NaBH_4$ solution and the solution was then decanted to yield borohydride-treated pellets. The pellets were rinsed well with water and dried at a forced air oven above 100° C. The pellets were further calcined in air to 400° C. for 2 to 3 hr. XRF analysis of the calcined treated pellets (designated 3×-$RuO_2/ZrO_2$) found 0.454% by weight Ru. The % $SO_2$ conversion of a gas stream containing 0.5% $SO_2$ and 7% $O_2$ was evaluated in the TCAT reactor at various temperatures for catalyst 3 (example 3 catalyst—fresh cycle) and 3A (example 3 catalyst—aged cycle) with the results tabulated in Table 2.

Example 4

This example illustrates the coating of $Zr(OH)_4$ powder with colloidal silica after deposition of the ruthenium phase. 45.0 g of $Zr(OH)_4$ powder was slurried and stirred in 439.5 g deionized water for several minutes. To a 2 liter jar mill was added 500 ml of ⅜" zirconia media to which the slurry was added along with 48 g water. The jar mill was ball milled for 17 h. The ball-milled $Zr(OH)_4$ slurry was rinsed through a sieve screen into a 1 liter beaker with the volume totaling about 725 mL.

To the ball-milled slurry was added 12.1 g $RuCl_3*1.79$ $H_2O$ and 50 ml water. The slurry was heated to 90° C. in an oil bath. Over a 2.5 h period, the slurry turned green gray. The slurry was then filtered at about 70° C. through a fine sintered glass filter (600 ml). The collected wet cake was rinsed with hot water to remove excess aqueous $RuCl_3$ solution.

The wet cake and washings were combined in a blender with 38.6 g of Nyacol 1440 colloidal silica (40% silica) to yield about 200 ml of slurry. The slurry was blended for 12 min. then transferred to a vacuum oven and dried above 100° C. overnight.

The dried solids were recovered giving 64.31 g. The aggregates were sieved to give a 10 to 12 mesh fraction weighing about 16.8 g. The granules were place in a muffle furnace and heated in air as follows: 173 to 200° C. for about 90 m, then at 355 to 450° C. for about 2.0 hours, followed by cooling to room temperature. The olive-green granules weighed 15.9 g. A 2.6 cc portion (2.87 g containing 4.67% by weight Ru by XRF) was loaded into a TCAT reactor tube. The % $SO_2$ conversion of a gas stream containing 0.5% $SO_2$ and 7% $O_2$ was evaluated in the TCAT reactor at various temperatures for catalyst 4 (example 4 catalyst—fresh cycle) and 4A (example 4 catalyst—aged cycle) with the results tabulated in Table 2.

Example 5

To 98 ml of water in a 500-ml Erlenmeyer flask were added 2.40 g $RuCl_3$* 1.79 $H_2O$ and a few drops of Triton CF-32 surfactant. 8.98 g mesoporous $ZrO_2$ (purchased from Mesotech Modern Materials Inc.) was added to the ruthenium solution in 16 spatula amounts. Another 83 ml of water were added followed by several drops more CF-32 surfactant to improve wetting of the powder. The slurry was swirled manually every 20 min. for about 110 min. while heating at 90° C. in an oil bath.

The slurry was filtered through #1 Whatman paper to yield a filter cake that was then washed with water. A second filtration using a fine filter had no accumulation of material. The powder was dried at 115° C. in a vacuum oven to yield a gray- and cream-colored powder weighing 7.7 g. That powder was calcined in air using a muffle furnace as follows: about 200° C. for 80 min. then up to 420° C. over 4.5 h. A calcined olive green powder produced that was pressed to make 10 to 12 mesh granules with 2.6 cc weighing 3.90 g. XRF analysis of the calcined powder gave 1.50% by weight Ru. The % $SO_2$ conversion of a gas stream containing 0.5% $SO_2$ and 7% $O_2$ was evaluated in the TCAT reactor at various temperatures for catalyst 5 (example 5 catalyst—fresh cycle) and 5A (example 5 catalyst—aged cycle) with the results tabulated in Table 2.

Example 6

A representative sample of ruthenium oxide was prepared as follows. To 148 g of water was added 55.9 g of $RuCl_3$*1.79$H_2O$ (the degree of hydration was calculated from the %-Ru value) and the solution stirred for about 20 min. until all of the salt was dissolved. An ammonium hydroxide solution was made up from 257 g concentrated $NH_4OH$ (28.8% $NH_3$ assay) added to 1006 g water in a 2 liter beaker. The $RuCl_3$ solution was added drop wise over an hour into the $NH_4OH$ solution with vigorous stirring throughout the addition. The solution was stirred for another 90 minutes, whereupon the stirring was stopped. After 15 minutes of settling, the solution was filtered through a 600 ml fine porosity sintered glass filter. The wet cake of hydrous ruthenium dioxide was rinsed twice with water then 121.0 g were transferred to a crucible and dried overnight in a vacuum oven at 135° C. The dried solid weighed 28.9 g.

The solid was pressed into wafers using a Carver press which were then broken through sieves. A fraction in the 2.1 to 2.4 μm range weighed 8.43 g. The granules were place in a crucible and air calcined in a muffle furnace according to the following schedule: 200° C. hold for 45 minutes; 350° C. for 1 h; and 400-460° C. for 45 minutes. Cooled granules weighed 6.64 g. A 2.6 cm³ portion of those granules weighed 3.2 g. The BET surface area of the calcined ruthenium dioxide was determined to be 31.2 m²/g. The % $SO_2$ conversion of a gas stream containing 0.5% $SO_2$ and 7% $O_2$ was evaluated in the TCAT reactor at various temperatures for catalyst 6 (example 6 catalyst—fresh cycle) and 6A (example 6 catalyst—aged cycle) with the results tabulated in Table 2.

TABLE 2

| | % $SO_2$ conversion of a gas stream containing 0.5% $SO_2$ and 7% $O_2$ evaluated at various temperatures for the catalysts of Examples 1-6 | | | | | | | | | | | |
|---|---|---|---|---|---|---|---|---|---|---|---|---|
| Temp (° C.) | 1 | 1A | 2 | 2A | 3 | 3A | 4 | 4A | 5 | 5A | 6 | 6A |
| 250 | 2.3 | 0.9 | 21.0 | 8.6 | 4.2 | 4.5 | 4.2 | 4.5 | 15.5 | 4.2 | 81.9 | 98.1 |
| 275 | 3.5 | 1.6 | 36.3 | 17.1 | 10.5 | 6.7 | 8.4 | 8.9 | 17.1 | 9.7 | 99.2 | 99.4 |
| 300 | 4.4 | 3.7 | 59.3 | 34.2 | 23.0 | 22.2 | 21.0 | 20.1 | 21.2 | 20.8 | 99.5 | 99.4 |
| 325 | 25.0 | 10.2 | 87.0 | 58.9 | 47.1 | 43.3 | 46.0 | 41.2 | 37.9 | 40.7 | 99.5 | 99.3 |
| 350 | 45.2 | 34.9 | 100.0 | 89.2 | 81.4 | 75.1 | 74.1 | 66.8 | 68.4 | 69.7 | 99.5 | 99.3 |
| 375 | 87.4 | 83.9 | 100.0 | 98.9 | 99.0 | 97.1 | 88.3 | 88.3 | 93.5 | 93.2 | 99.3 | 99.2 |

The data in Table 2 show that the most active vanadium-based catalysts (catalysts 1 and 1A) do not show higher than 30% $SO_2$ conversion until 350 to 375° C. In contrast, catalysts based on a ruthenium active phase (numbered 2 through 6) exhibit high activity at as low as 250° C. for a bulk prepared form of ruthenium dioxide and at about 300 to 325° C. for supported ruthenium active phase catalysts presented in examples 2 through 5.

Example 7

Powder X-ray diffraction (XRD) analysis on catalyst 6 before (FIG. 2, reference 2) and after (FIG. 2, reference 1) operation in the TCAT reactor establish that ruthenium dioxide is observed as the crystalline phase both before and after $SO_2$ oxidation in the TCAT reactor. For reference, the X-ray diffraction pattern is plotted in FIG. 2 on top of the "stick pattern" given for $RuO_2$ taken from the powder diffraction files (PDF) for sample #40-1290 (authenticated powder pattern for $RuO_2$).

Figure 2:
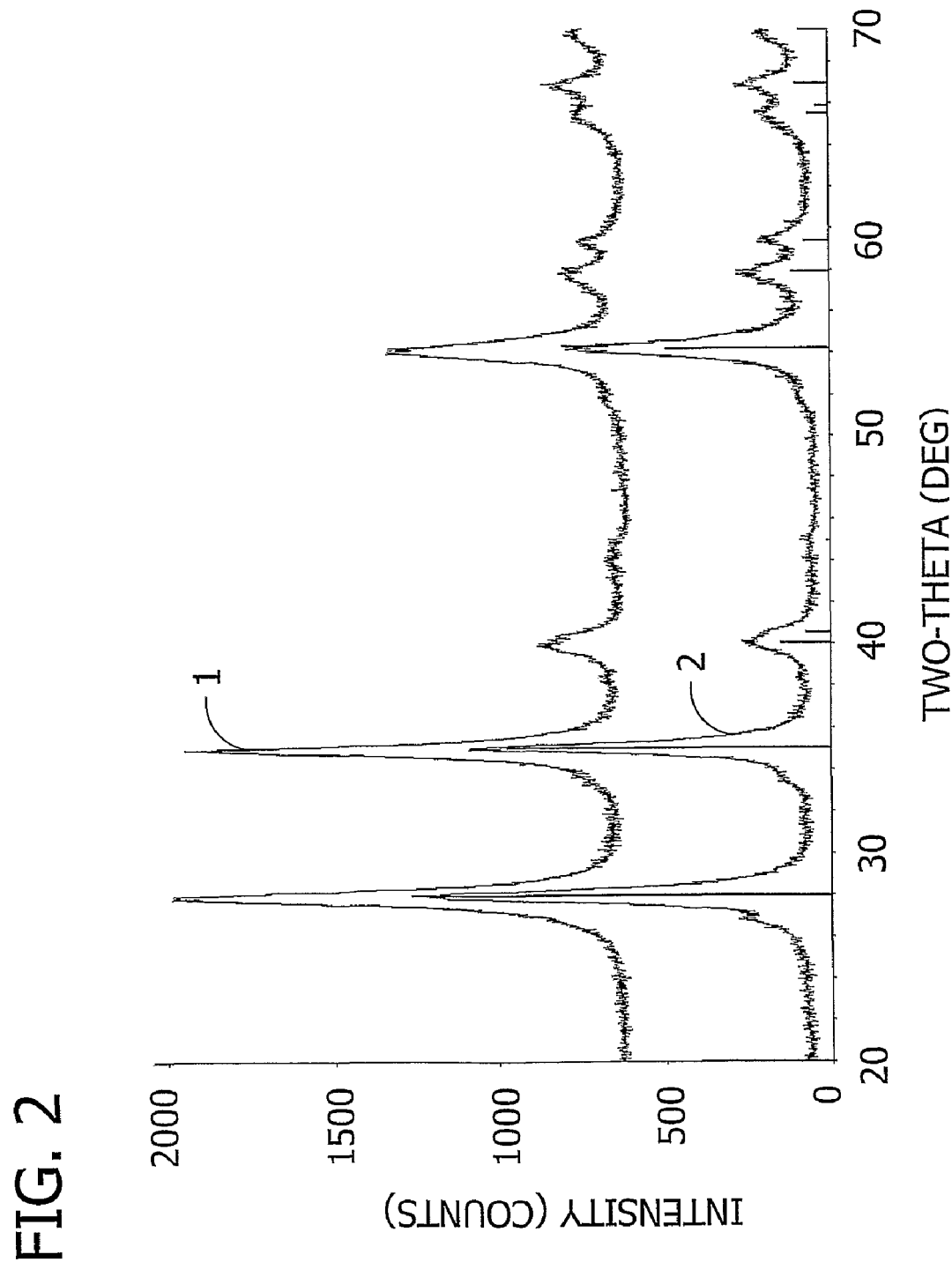
FIG. 2 shows x-ray diffraction patterns for powdered samples of the granular 2.1 to 2.4 μm ruthenium oxide catalyst prepared in Example 6 after $SO_3$ conversion in a thermal catalyst aging tester (TCAT) reactor system (designated "post-conversion") (labeled reference 1); before $SO_3$ conversion (designated "pre-conversion") (labeled reference 2); and the "stick pattern" for a $RuO_2$ reference standard taken from PDF 40-1290 as represented by the spikes on the Two-Theta axis.

The comparative XRD patterns in FIG. 2 confirm that $RuO_2$ constitutes a crystalline phase found in this catalyst for oxidation of $SO_2$.

Example 8

The following two examples illustrate preparation of supported ruthenium oxide catalysts. Ring shaped 5-mm tablets of silica (Nikki Chemical, N601A3, 264 m$^2$/g BET surface area) were broken and sieved to give 2.1- to 2.4-μm granules. A total of 3.4 g of silica granules were added to a 125 ml addition funnel fitted with stopcocks at both ends and a plug of glass wool above the lower stopcock. The top stopcock was opened and the entire addition funnel placed under house vacuum for 1.5 h. A solution of RuCl$_3$ (15.1 g of RuCl$_3$*2.42H$_2$O in 53.1 mL) was prepared containing 20 drops of surfactant (made from 20 drops of Triton CF-32 dissolved in 100 ml water). The RuCl$_3$ solution was drawn by vacuum over the silica granules in the addition funnel and the solution remain over the granules for 2.3 h. The bottom stopcock was opened and the excess solution was drained off using a nitrogen purge supplied from the top stopcock. The nitrogen gas was then switched to anhydrous ammonia. The bottom stopcock was removed and pH paper placed at the bottom exit of the addition funnel. Within 10 minutes the liquid draining from the granules turned the pH paper blue (basic) indicating breakthrough of the ammonia.

The granules were recovered into a crucible and dried in a forced air oven at 120° C. overnight. The crucible was then transferred to a muffle furnace and air calcined at 200 to 265° C. for 2 hours and then held at between 380 to 440° C. for another 2 hours. A 2.6 cc portion of those granules (1.2 g containing 4.5% Ru by weight using XRF analysis) were loaded into a TCAT reactor tube and evaluated according to the procedure given. The % SO$_2$ conversion of a gas stream containing 0.5% SO$_2$ and 7% O$_2$ was evaluated in the TCAT reactor at various temperatures for catalyst 8 (example 8 catalyst—fresh cycle) and 8A (example 8 catalyst—aged cycle) with the results tabulated in Table 3.

Example 9

This example followed the general procedure used in Example 8. A total of 3.4 g of silica granules were added to a 125 ml addition funnel. The top stopcock was opened and the entire addition funnel placed under house vacuum for 45 minutes. A solution of ZrOCl$_2$*8H$_2$O (19.4 g in 50 ml water) containing 20 drops of CF-32 surfactant solution (prepared as described in Example 8) was drawn through the bottom stopcock of the addition funnel so as to cover the silica granules. The granules were soaked in this solution overnight. The solution was drained away from the granules and the excess solution pushed out of the funnel using a nitrogen purge from the top stopcock. The nitrogen purge was then replaced with anhydrous ammonia from a lecture bottle. A wet pH paper was exposed to the gas vent through the opened bottom stopcock. When the paper color showed a change from acidic to basic pH, the ammonia was shut off and replaced by a nitrogen purge.

A solution of RuCl$_3$ (15.1 g of RuCl$_3$*2.42H$_2$O in 51 ml) was prepared containing 20 drops of Triton CF-32 surfactant solution. The RuCl$_3$ solution was drawn by vacuum over the silica granules in the addition funnel and the solution remain over the granules for 1.2 h. The bottom stopcock was opened and the excess solution was drained off using a nitrogen purge supplied from the top stopcock.

The granules were recovered into a crucible and dried in a forced air oven at 120° C. for 1.2 hours. The crucible was then transferred to a muffle furnace and air calcined at 199 to 252° C. for 1.2 hours and then held at between 375 to 452° C. for another 2 hours before cooling to room temperature. A 2.6 cc portion of these granules (1.4 g containing 8.7% Ru by weight using XRF analysis) was loaded into a TCAT reactor tube and evaluated. The results for this catalyst are recorded in Table 3 as catalyst 9 (fresh) and 9A (aged).

TABLE 3

% SO$_2$ conversion of a gas stream containing 0.5% SO$_2$ and 7% O$_2$ evaluated at various temperatures for the catalysts of Examples 8 and 9

| Temp °(C) | 8 | 8A | 9 | 9A |
|---|---|---|---|---|
| 250 | 10.6 | 9.3 | 14.7 | 18.0 |
| 275 | 22.4 | 21.7 | 28.4 | 37.0 |
| 300 | 43.2 | 42.0 | 57.4 | 67.7 |
| 325 | 76.0 | 76.0 | 90.8 | 94.8 |
| 350 | 96.0 | 95.4 | 99.5 | 99.6 |
| 375 | 99.5 | 99.4 | 99.6 | 99.6 |

Example 10

This example describes both monolith support and catalyst preparation showing low temperature activity and stability. Silica monolith support pieces having about 200 cells per square inch ("cpsi") (about 31 cells per square centimeter) were made from a combination of: (1) 30% by weight silica powder having high surface area (Sylox 15 supplied by W. R. Grace & Co. having a BET surface area of about 300 m$^2$/g) and (2) 70% by weight silica powder having low surface area (a BET surface area of less than 1 m$^2$/g, supplied by Applied Ceramics, Inc.). The catalyst for the laboratory reactor evaluations was prepared using 200 cpsi cylindrical silica monolith pieces that were on average 2.3 cm in diameter, 7.4 cm long, and 21.6 g in weight.

Washcoated silica monolith pieces were prepared by dip coating using a 15% slurry (30.7 g) of Sylox 15 added to 70 g of a prehydrolyzed solution of tetraethylorthosilicate ("TEOS"), ethanol (57.8 g), water (47.3 g) and 0.14 g of concentrated nitric acid. Five dips were made for each of three monolith samples then the excess slurry was blown off using an air jet. The freshly coated monoliths were placed in a forced air oven at 130° C. for at least 2 hours. The dried samples were then calcined in air by heating to 200° C. over one hour, holding for at least 30 minutes, then ramping to 550° C. and holding for 2 hours at that temperature before cooling to room temperature over several hours. Percent weight uptakes for the three recovered samples ranged from 6.9 to 12.2% over the "as received" silica monolith weights.

The washcoated silica monoliths were then loaded with a ruthenium active phase. First, the monolith samples were placed in a first glass reaction vessel capped by a ground glass adapter. On each side of the reaction vessel was a Teflon stopcock. With one stopcock closed, the coated monolith samples were pumped down under house vacuum for degassing for 12 minutes. An aqueous solution of 2.95 M RuCl$_3$ was prepared using the salt RuCl$_3$*2.42H$_2$O. The vacuum in the reaction vessel was used to draw the RuCl$_3$ solution over the monoliths. Vacuum was then used to outgas the immersed samples. After about 10 minutes, the vacuum was stopped and nitrogen gas was used to purge the vessel of excess RuCl$_3$ solution. The soaked monoliths were transferred to a second glass reaction vessel and the nitrogen purge continued. The nitrogen gas was then replaced with ammonia at a flow setting of "150" (SCCM). The ammonia flow continued until a wet pH paper at the end of the reaction vessel turned blue. Each ammonia-treated monolith was suspended over a steel beaker by a wire wrapped around the outside of the monolith. The excess slurry was removed from each coated monolith using a wire to free the slurry from the channels. The wet monoliths were then placed in a forced air oven at 130° C. for at least 2 hours. The dried monoliths showed a purple-black color when removed from the oven. They were then placed in a muffle furnace and calcined in air to 200° C. for about 45 minutes and then taken to between 385 and 427° C. for 3 hours.

The cooled coated monoliths showed weight gains between 16.4 and 17.5%. One coated monolith was selected for TCAT reactor activity-stability measurements. The monolith was cut into rectangular pieces approximately 5 mm on a side and having about two (200 cpsi) channels on a side. A total of 1.7 g of those small 5×5 mm pieces were loaded in about 4.5 cc volume into a quartz tube reactor between quartz wool plugs. The % $SO_2$ conversion of a gas stream containing 0.5% $SO_2$ and 7% $O_2$ was evaluated in the TCAT reactor at various temperatures for catalyst pieces designated as 10-1 in the first fresh cycle and 10-1A in the first aging cycle. Three more fresh cycles (10-2 through 10-4) and aging cycles (10-2A through 10-4A) were run on this catalyst having the conversion data as a function of temperature shown on Table 4 below. The conversion data show that with the exception of an activity decline (89% of fresh) between the fresh and aged cycles, the catalyst pieces showed stable activity in subsequent fresh-aged cycles.

TABLE 4

% $SO_2$ conversion of a gas stream containing 0.5% $SO_2$ and 7% $O_2$ evaluated at various temperatures for the catalysts of Example 10

| Temp °(C.) | 10-1 | 10-1A | 10-2 | 10-2A | 10-3 | 10-3A | 10-4 | 10-4A |
|---|---|---|---|---|---|---|---|---|
| 250 | 10.9 | 9.8 | 8.5 | 9.3 | 8.2 | 8.8 | 7.7 | 9.0 |
| 275 | 24.5 | 21.0 | 18.2 | 18.9 | 18.5 | 19.0 | 16.4 | 18.6 |
| 300 | 48.0 | 40.1 | 37.5 | 36.4 | 36.8 | 36.1 | 34.1 | 34.9 |
| 325 | 76.3 | 62.9 | 60.3 | 58.4 | 61.1 | 57.4 | 57.2 | 57.0 |
| 350 | 92.1 | 85.2 | 84.1 | 82.5 | 83.9 | 81.7 | 81.1 | 80.1 |
| 375 | 97.1 | 94.8 | 94.5 | 93.9 | 94.7 | 93.6 | 93.3 | 93.0 |

Example 11

Figure 3:
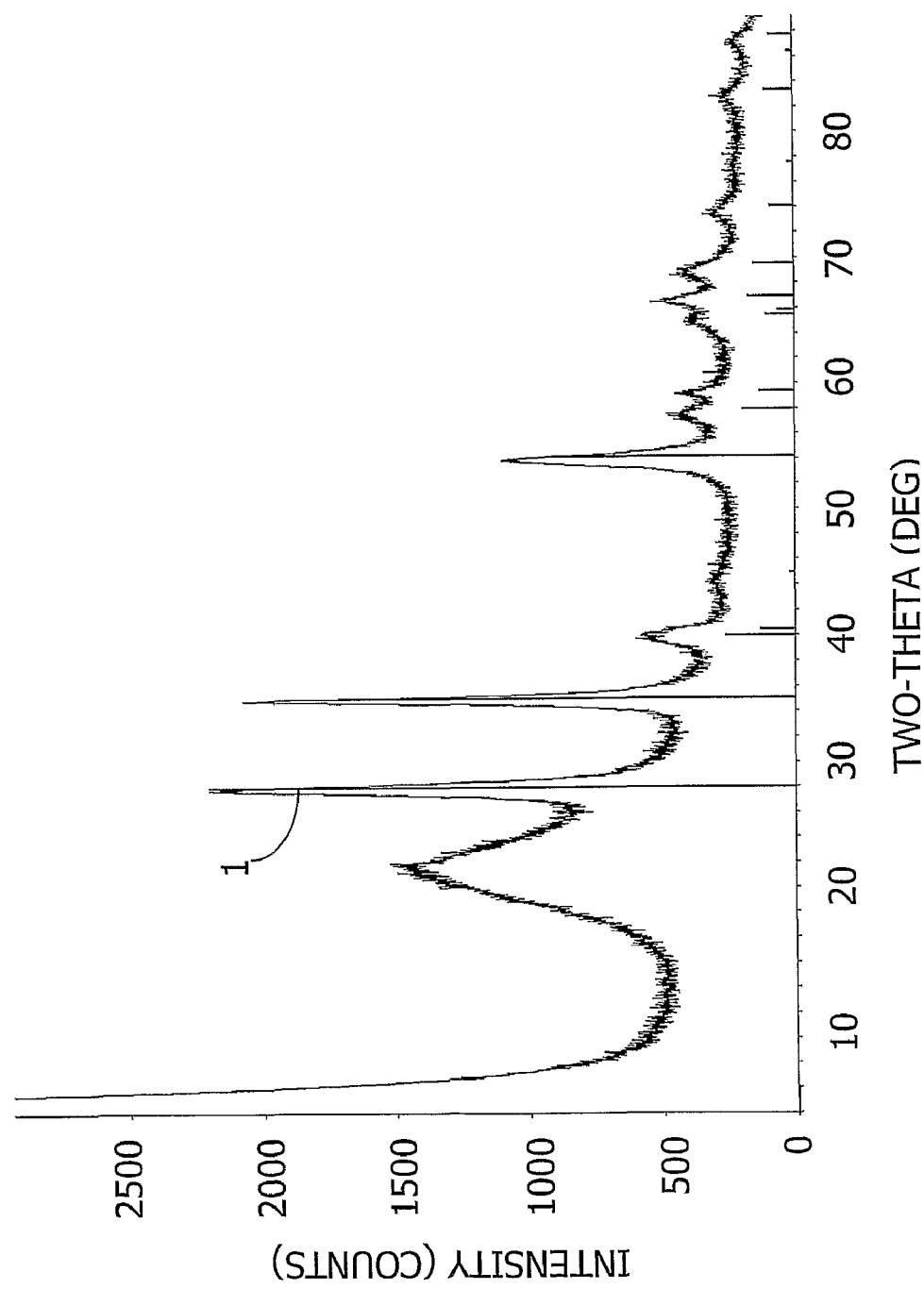
FIG. 3 shows x-ray diffraction patterns for the monolith catalyst prepared in Example 10 (ruthenium oxide/TEOS-Sylox-15/Sylox-15 on 200 cpsi monolith cut to about 5 mm×5 mm pieces) before $SO_3$ conversion (labeled reference 1) as compared to the "stick pattern" for a $RuO_2$ reference standard taken from PDF 40-1290 as represented by the spikes on the Two-Theta axis.

Powder X-ray diffraction (XRD) analysis on catalyst 10 before operation in the TCAT reactor establishes that ruthenium dioxide is observed as the crystalline phase formed after the processing described in Example 10. The powder pattern is displayed in FIG. 3 (reference 1) stacked on top of the "stick pattern" for $RuO_2$.

The three highest intensity peaks (assigned as the 110, 101, and 211 reflections using hkl Miller indices notation) have peak widths (full width at half height maximum, FWHM) averaging 0.934° giving an average crystallite size of 92 Å for the ruthenium dioxide formed on the monolith catalyst surface.

Example 12

The catalyst activity and stability results obtained in Example 10 were used for making larger silica monolith catalysts. The silica monoliths were obtained from Applied Ceramics, Inc., having 200-cpsi cell density and the same composition as in Example 10 comprising high and low surface area silica. Twelve monoliths were used for the integral reactor tests. The 12 silica monoliths averaged 6.49 cm in diameter, 75.0 cm in length, 247.4 cc in volume, and 109.8 g in weight. Due to the thickness of the silica wall surrounding each monolith and its inherent porosity, the exterior of each monolith was coated with Teflon tape prior to washcoat application. Washcoat slurries were made in 1 liter bottles as batches consisting of the coating solution (108 g water, 132 g ethanol, 160 g TEOS, and 0.32 g of concentrated nitric acid mixed for 1 h prior to making the slurry) and Sylox 15 silica powder (70.1 g). The slurry was added to a 500 ml coating beaker containing a 1.5" magnetic stir bar and stirred vigorously as the Teflon-taped silica monoliths were immersed in the slurry. A total of five batches of slurry were necessary to coat the 12 monoliths. Excess slurry was removed from the channels using an air jet then the Teflon tape was removed. The monoliths were dried in a forced air oven at a temperature of at least 110° C.

The dried monoliths were calcined in a muffle furnace programmed to 200° C. for at least 1 hour followed by a ramp and hold to 550° C. with a hold time of at least 2 hours. The calcined monoliths averaged 18.7 g of silica uptake per monolith (14.5% average weight increase).

Ruthenium active phase loading followed the general procedures of Example 10. The silica-washcoated monoliths were Teflon-tape wrapped about the exterior shell of the monolith to prevent direct contact of the active phase solution with the outer silica shells of the monoliths. The taped monoliths were placed in a large reaction vessel fitted with stopcocks on each end. House vacuum was applied to the vessel. The vacuum was used to draw a solution of 3.1 M $RuCl_3$ into the vessel and the monolith was soaked for 4 minutes in this solution. The lower stopcock was opened and the $RuCl_3$ solution drained by gravity followed by a nitrogen purge introduced from the upper stopcock on the reaction vessel. The impregnated monolith was then placed in another reaction vessel and ammonia gas was passed over the monolith until a wet red litmus paper at the opposite end of the vessel (at the stopcock exit) turned blue from contact with ammonia vapor. Loose precipitate was scraped off the monolith and a 4N $NH_4OH$ solution was poured over the monolith. The channels were cleared using an air jet and a nichrome wire if needed. The Teflon tape was then removed from the shell of the monolith and each monolith was laid on its side in a steel tray. The monolith was placed in a forced air oven at 130° C. for at least 2 hours. The dried monoliths were then calcined in a muffle furnace in air first to 200° C. for about an hour then taken to 400° C. for 2 hours. The 12 calcined monoliths showed an average uptake each of 21.4 g or 14.2%.

Example 13

The 12 activated monolith catalysts prepared in Example 12 were used for integral reactor evaluations using a 3" (7.6 cm) stainless steel tube that was 48" (121.9 cm) in length and attached on one end to a stainless steel flange. The flange provided ports for gas sampling or temperature recording every 3.5" (8.9 cm) down the tube in addition to 1" (2.5 cm) bulkhead fitting that connected the tube to the reactor gas manifold system that consisted of three mass flow controllers for sulfur dioxide, air (pre-dried by molecular sieves column system) and nitrogen. The reactor tube was loaded with each of the 12 monolith catalysts using pre-calcined silica tape to wrap the exterior of each monolith and provide gasket-seal between the reactor tube (3"; 7.6 cm) and the monolith catalysts (2.55"; 9.0 cm). The loaded reactor was dropped into a vacuum-jacketed tube that was heated on the outer shell to minimize heat exchange between the inner reactor and the surroundings. The gas to reactor was preheated to within a degree of the preset gas inlet temperature.

The monolith catalyst was then set to simulate the $4^{th}$ pass after interpass absorption in a sulfuric acid plant to which the first pass was fed 11.7% $SO_2$ and 9.3% $O_2$. Under these conditions, the 4$^{th}$ pass is fed gas at 75 SLFM that for this monolith reactor corresponded to 76 SLPM total gas flow. The 76 SLPM gas consisted of 0.704% $SO_2$ and 4.54% $O_2$ with the balance $N_2$ and the results of an integral reactor run with an inlet temperature of 350° C. is recorded in Table 5.

By comparison, when SCX-2000 catalyst is charged to a 4" (10.2 cm) integral reactor tube and evaluated in the reactor system described in Example 12 using a gas having linear gas velocity of 76 SLFM containing after interpass absorption 0.689% $SO_2$ and 4.88% $O_2$ (taken as 95.00% conversion from a pass 1 gas composition of 11.5% $SO_2$ and 9.55% $O_2$) from by GC analysis with the balance of the gas as nitrogen, a cumulative conversion of 99.67% conversion is seen after 40" (101.6 cm) of the catalyst giving 0.046% $SO_2$ and 4.7% $O_2$ by GC analysis or 460 ppm $SO_2$ at this 40" bed depth.

TABLE 5

| Sampling port at monolith depth (cm) | % $SO_2$ | % $O_2$ | Cumulative % $SO_2$ conversion from 11.7% $SO_2$ | Temp (° C.) |
|---|---|---|---|---|
| Inlet Port | 0.704 | 4.54 | 95.0 | 350.7 |
| 7.6 | 0.326 | 4.33 | 97.7 | — |
| 15.2 | 0.168 | 4.29 | 98.8 | — |
| 22.9 | 0.074 | 4.25 | 99.5 | — |
| 30.5 | NA* | NA* | — | 365.0 |
| 38.1 | 0.010 | 4.25 | 99.9 | — |
| 45.7 | NA* | NA* | — | 356.0 |
| 53.3 | 0.002 | 4.17 | 100.0 | — |
| 61.0 | 0.002 | 4.18 | 100.0 | — |
| 68.6 | 0.000 | 4.24 | 100.0 | — |
| 76.2 | NA* | NA* | — | — |
| 83.8 | NA* | NA* | — | — |
| 91.4 | 0.003 | 4.24 | 100.0 | — |
| Outlet Port | — | — | — | 353.7 |

*NA = Not Available

The results in Table 5 show that the monolith catalyst achieves below 0.010% $SO_2$ or 100-ppm emissions in 15" (38.1 cm) depth of monolith catalyst (0.91 lbs $SO_2$/standard-tons-per-day (STPD) of acid assuming a 2500 STPD plant) and by 21" (53.3 cm) the emission of $SO_2$ is at 0.002% $SO_2$ or 20 ppm (0.13 lbs $SO_2$/STPD of acid).

Example 14

Higher gas velocities are possible with monolith catalysts of this invention having ruthenium active phase as shown by the following example. The catalyst prepared in Example 12 and evaluated in Example 13 was evaluated in the same integral reactor as described in Example 13, but the gas velocity increased to 119 SLFM from 75 SLFM. The inlet temperature was kept at 350° C. with the same gas composition (0.7% $SO_2$ and 4.5% $O_2$ with the balance $N_2$) as in Example 13. The results are shown in Table 6.

TABLE 6

| Sampling port at monolith depth (cm) | % $SO_2$ | % $O_2$ | Cumulative % $SO_2$ conversion from 11.7% $SO_2$ | Temp (° C.) |
|---|---|---|---|---|
| Inlet Port | 0.705 | 4.81 | 95.0 | 349.7 |
| 7.6 | 0.434 | 4.73 | 96.9 | — |
| 15.2 | 0.273 | 4.63 | 98.1 | — |
| 22.9 | 0.168 | 4.65 | 98.8 | — |
| 30.5 | NA* | NA* | — | 371.0 |
| 38.1 | 0.032 | 4.55 | 99.8 | — |
| 45.7 | NA* | NA* | — | 366.0 |
| 53.3 | 0.017 | 4.56 | 99.9 | — |

TABLE 6-continued

| Sampling port at monolith depth (cm) | % $SO_2$ | % $O_2$ | Cumulative % $SO_2$ conversion from 11.7% $SO_2$ | Temp (° C.) |
|---|---|---|---|---|
| 61.0 | 0.008 | 4.53 | 99.9 | — |
| 68.6 | 0.005 | 4.56 | 100.0 | — |
| 76.2 | NA* | NA* | — | — |
| 83.8 | NA* | NA* | — | — |
| 91.4 | 0.001 | 4.47 | 100.0 | — |
| Outlet Port | — | — | — | 358.9 |

*NA = Not Available

The results in Table 6 show that the monolith catalyst achieves below 0.008% $SO_2$ or 80 ppm emissions in 24" (61.0 cm) depth of monolith catalyst (0.78 lbs $SO_2$/standard-tons-per-day (STPD) of acid assuming a 2500 STPD plant), by 27" (68.6 cm) the conversion of $SO_2$ is at 0.005% $SO_2$ or 50 ppm (0.52 lbs $SO_2$/STPD of acid), and finally reaches in 36" (91.4 cm) of catalyst depth an $SO_2$ emission level of 0.001% $SO_2$ or 10 ppm (0.13 lbs $SO_2$/STPD of acid).

Example 15

An aqueous based coating process was developed for extruded ceramic monoliths and applied to a set of 200 cpsi Sylox 15 silica monoliths obtained from Applied Ceramics, Inc. The washcoat was comprised of a high surface area source of silica such as Sylox 15 powder obtained from W. R. Grace. To a 10 liter carboy was added 1769.8 g of Sylox 15 powder. To this carboy containing silica powder was added 10031.8 g of water in 1-kg portions. The suspension was placed on a roller mill for several hours. The suspension was fed through a Microfluidics Model M-110Y MICROFLUID-IZER processor having an air compressor gauge reading of 7,000 psig. Two modules were placed in series for processing the suspension: first a 200-μm "Z" configuration module (model number H30-Z) followed by a 75-μm "Y" configuration module (model number F20Y). Before passing through the MICROFLUIDIZER, the 14.9% Sylox 15 suspension showed a viscosity of about 75 centipoise (cps) as measured by a Brookfield viscometer using a #1 spindle at room temperature (16° C. to 22° C.). After processing through the MICROFLUIDIZER, the viscosity dropped to about 5 cps or less. Particle size measurements made using a Beckman Coulter LS 13320 particle size analyzer on the 75-cps silica suspension showed a bimodal particle size distribution with a major peak around 10 μm and a secondary peak around 200 μm. The mean particle size was 24.3 μm. After processing through the MICROFLUIDIZER, the secondary peak disappeared and a single particle size distribution peak was seen peaking between 10 and 20 μm with a mean particle size of 11.3 μm.

The microfluidized 14.9% Sylox 15 suspension, 2469.6 g, was mixed with 1270.2 g of Ludox TMA colloidal silica (34% as silica in water), and 12.3 g of a surfactant mixture consisting of 20.0 g of 95% aqueous Triton CF-32, 37.35 g of Triton X-102, 60.02 g of Triton 770, and 853.50 g deionized water. A set of 13 Sylox 15 monolith supports from Applied Ceramics having an average diameter of 6.50 cm, average length of 7.62 cm, and average volume of 248.3 cubic centimeter (cc) were wrapped with ½" Teflon pipe tape around the outer surface covering the entire length of each monolith. The monoliths were then dip coated in the Sylox 15-Ludox TMA-surfactant mixture, blown out with an air jet, and dried in a forced air oven at 120° C. for at least two hours. The dried monoliths were dip coated a second time and again dried at 120° C. The Teflon tape was removed and the monoliths were calcined in air to 550° C. over a six-hour period with an intermediate hold at 200° C. before ramping up to and holding at 550° C. for two hours. An average silica uptake of 11.1 weight-% was obtained after calcination based on the final weight of the monolith catalyst, The silica-coated monoliths were then immersed in a 4 weight-% solution of 100-nm $ZrO_2$ (using 20% Nyacol Zr100/20) contained in a vacuum desiccator. The immersed samples were treated under house vacuum for at least 10 minutes, then the channels were cleared using an air jet. The vacuum impregnated monoliths were dried at 120° C. in a forced air oven and then calcined to 400° C. in air. The %-zirconia uptake based on the uptake weight observed after calcination and the final weight of the monolith catalyst was 0.71%.

A solution of 0.75 M $RuCl_3$ was prepared. 6.50×7.62 cm monoliths were coated with silica and zirconia washcoat. The exterior of the coated monoliths were then wrapped with ½" Teflon pipe tape followed by immersion in the $RuCl_3$ solution. The four immersed monoliths were placed in a vacuum desiccator and house vacuum was then applied for about 10 minutes. The solution was drained from the monoliths then blown out of the channels using an air jet. The samples were dried to 120° C. for at least 2 hours. The Teflon tape was removed after drying in the forced air oven.

A total of 13 vacuum immersion-coated monoliths were loaded with hydrous $RuCl_3$. The monoliths were loaded pairwise into a stainless steel flow vessel using precalcined silica tape to provide a gasket for the monoliths in loading these into the treatment vessel. Two custom-built catalyst treatment vessels were fabricated to treat 7.62-cm long monoliths (or other catalyst shapes). The vessels were comprised of standard 3-inch (7.6 cm), schedule 40 stainless steel pipe fittings with one 6-inch (15.2 cm) long threaded nipple and two threaded end caps. The inside dimensions of the vessel were 3.07 inches diameter×8 inches long (7.8×20.3 cm), giving an interior volume of 970 cc. The two end caps as well as one location midway down the length of the nipple were drilled and tapped for ⅛" (3.2 mm) pipe threads. Three ¹⁄₁₆-inch tube×⅛-inch (1.6×3.2 mm) male pipe thread Swagelok connectors were threaded into these three locations. The two end fittings were used for gas inlet and outlet ports and the center fitting was drilled through for a ¹⁄₁₆-inch (1.6 mm) thermocouple to measure interior gas temperature.

The vessels containing two $RuCl_3/ZrO_2$-silica coated silica monoliths in series were placed in parallel in a muffle furnace with flexible ¹⁄₁₆-inch (1.6 mm) stainless tubing leading through the wall of the furnace to the external flow and scrubbing systems. The temperature was recorded on a digital datalogger. A flow of about 1 standard liter per minute (SLPM) of nitrogen gas was used to leak-check the vessels. The temperature of the furnace was set at 200° C. and a 1.2 SLPM flow of 2 to 3% hydrogen in nitrogen gas blend was supplied to both vessels. The treatment gas flow was continued for at least 24 hours then monitored with wet pH paper for evidence of HCl in the off gas (acid pH indicated). After overnight treatment, the gas flow was monitored for disappearance of the HCl in the gas stream. Once the HCl was observed to be decreasing, the vessels were cooled down, and the catalysts recovered. The recovered catalysts were then placed in a forced air oven and heated to 200° C. overnight (>16 hours) in air. The recovered monoliths showed an increase in weight due to uptake of the ruthenium-containing phase from that of the starting weight for the $ZrO_2$-silica-coated silica monolith catalysts. The average weight increase for these samples was 4.58%. XRF analysis of a catalyst sample cut from the monolith channels region (i.e., excluding the monolith outer wall) showed a 2.3% by weight ruthenium (3.2% by weight as $RuO_2$) and 0.34% by weight zirconium (0.46% by weight as $ZrO_2$).

After twelve of the monolith catalysts were processed (in sets of four) through the pipe cells for hydrogen-containing gas treatment at 200° C., the monolith catalysts were loaded into the reactor described in Example 13. The monolith catalyst set was then used to simulate the $4^{th}$ pass after interpass absorption in a sulfuric acid plant to which the first pass was fed 11.7% $SO_2$ and 9.5% $O_2$. Under those conditions, the $4^{th}$ pass was fed gas at 98.7 SLFM, corresponding to 99.6 SLPM total gas flow in the reactor. The 99.6 SLPM gas comprised 0.702% $SO_2$ and 4.77% $O_2$, with the balance being $N_2$. The results of the integral reactor run having an inlet temperature of 375° C. is recorded in Table 7. The outlet gas at 36" (91.4 cm) bed depth shows 20 ppm $SO_2$ (0.13 lbs $SO_2$/STPD of acid).

TABLE 7

| Sampling port at monolith depth (cm) | % $SO_2$ | % $O_2$ | Cumulative % $SO_2$ conversion from 11.7% $SO_2$ | Temp (° C.) |
|---|---|---|---|---|
| Inlet Port | 0.702 | 4.77 | 95.0 | 375.2 |
| 7.6 | 0.440 | 4.65 | 96.9 | — |
| 15.2 | 0.362 | 4.58 | 97.4 | — |
| 22.9 | 0.235 | 4.51 | 98.3 | — |
| 30.5 | NA* | NA* | — | 396.0 |
| 38.1 | 0.123 | 4.51 | 99.1 | — |
| 45.7 | NA* | NA* | — | 390.0 |
| 53.3 | 0.040 | 4.42 | 99.7 | — |
| 61.0 | 0.011 | 4.42 | 99.9 | — |
| 68.6 | 0.007 | 4.39 | 100.0 | — |
| 76.2 | NA* | NA* | — | — |
| 83.8 | NA* | NA* | — | — |
| 91.4 | 0.002 | 4.44 | 100.0 | — |
| Outlet Port | — | — | — | 383.8 |

*NA = Not Available

Example 16

This example evaluated the use of nitrate salts ruthenium to prepare catalysts of this invention.

For catalyst 11, a 100 ml aqueous solution of 0.6 M $RuNO(NO_3)_3$ was prepared by dissolving 19.038 g of $RuNO(NO_3)_3$ from Alfa Aesar in 100 ml water and adding 1 drop of Triton CF-32. Nikki silica ring granules (6.710 g, 2.1 to 2.4 µm in particle size) were placed in a 100 ml beaker to which was added enough 0.6 M $RuNO(NO_3)_3$ solution to cover the granules. The beaker was placed in a vacuum desiccator and house vacuum was applied for 6 minutes. The granules were recovered on a 20-mesh steel screen for removal of excess solution then transferred to a forced air oven at 120° C. for drying.

Catalyst 12 was prepared as follows. $ZrO_2$-loaded Nikki silica ring granules were prepared by immersion of Nikki silica ring granules (2.1 to 2.4 µm in particle size) in a 3 wt % colloidal solution of Nyacol 100-nm $ZrO_2$ (prepared by dilution from a 20 wt % colloidal solution of 100-nm $ZrO_2$). The $ZrO_2$-loaded Nikki silica ring granules were dried at 120° C. in a forced air oven for at least two hours. To 25 ml of 0.6 M $RuNO(NO_3)_3$ solution was added another 25 ml of water to give a solution of 0.3M $RuNO(NO_3)_3$. To a 50 ml round bottomed flask was added 7.471 g of 120° C.-dried 100-nm $ZrO_2$/silica granules. The dried 100-nm $ZrO_2$/silica granules were then sequentially coated with 23.438 g of 3% 50-nm colloidal $ZrO_2$ solution followed by 11.719 g of 0.30 M $RuNO(NO_3)_3$ solution using a rotary evaporator over a two-hour period at 70° C. oil bath temperature. The granules were recovered on a 20-mesh steel screen for removal of excess solution then transferred to a forced air oven at 120° C. for drying.

Catalyst 13 was prepared as follows. $ZrO_2$-loaded Nikki silica ring granules were prepared by immersion of Nikki silica ring granules (2.1 to 2.4 μm in particle size) in a 3 wt % colloidal solution of Nyacol 50-nm $ZrO_2$ (prepared by dilution from a 12 wt % colloidal solution of 50-nm $ZrO_2$). The $ZrO_2$-loaded Nikki silica ring granules were dried at 120° C. in a forced air oven for at least two hours. The dried 50-nm $ZrO_2$/silica granules were then immersed in a solution of 0.3M $RuNO(NO_3)_3$ in a vacuum desiccator for 6 minutes under house vacuum. The granules were recovered on a 20-mesh steel screen for removal of excess solution then transferred to a forced air oven at 120° C. for drying.

Catalyst 11, two portions of Catalyst 12, and Catalyst 13 were loaded into four 0.75"×2" stainless steel wire baskets, each capped with quartz wool, and then loaded into a flanged pipe containing Swagelok fittings on both flange ends. The granules were first treated at 150° C. in 3% $H_2$ in nitrogen for 5 hours. Catalysts 11 through 13 were removed from the flanged pipe and found to be red-brown in color. The catalysts were returned to the flanged pipe and heated in 3% $H_2$ in nitrogen up to 205° C. for 6 hours. After cooling the flanged pipe-containing sample overnight to room temperature, the granules were recovered and found to have a matte black appearance with reasonably complete coverage of the granules with this black product.

The 3% $H_2$ in nitrogen-treated granules were then further activated in a gas stream containing a blend of 2% $SO_2$, 5% $O_2$ in nitrogen. The granules were treated using individual stainless steel wire baskets in a larger cylindrical metal basket having a mesh screen across the bottom. The granules were heated at about 350° C. for two hours.

Further evaluations were made using 2.6 cc portions of the activated samples in the TCAT reactors. The results of these reactor evaluations are shown in Table 8 below. Catalyst 11 in Table VII is "$RuO_2$/Silica granules," catalyst 12 is "$RuO_2$-50-nm $ZrO_2$/100-nm $ZrO_2$/Silica granules," and catalyst 13 is "$RuO_2$-50-nm $ZrO_2$/Silica granules," The aged samples (375° C. for 24 hours) have TCAT reactor data collected at the temperatures shown in the columns headed "11A," "12A," and "13A" for catalysts 11, 12, and 13, respectively.

TABLE 8

% $SO_2$ conversion of a gas stream containing 0.72% $SO_2$ and 7% $O_2$ evaluated at various temperatures for the catalysts of Example 16

| Temp °(C.) | 11 | 11A | 12 | 12A | 13 | 13A |
|---|---|---|---|---|---|---|
| 250 | 9.9 | 9.9 | 5.9 | 9.6 | 7.5 | 5.6 |
| 275 | 23.3 | 22.3 | 13.9 | 21.4 | 16.8 | 13.4 |
| 301 | 47.0 | 46.8 | 29.3 | 44.4 | 34.3 | 30.5 |
| 326 | 79.0 | 80.4 | 55.9 | 75.8 | 61.2 | 59.1 |
| 351 | 98.4 | 98.6 | 94.1 | 97.1 | 90.6 | 91.5 |
| 376 | 99.6 | 99.6 | 99.7 | 99.6 | 99.5 | 99.5 |

Figure 4:
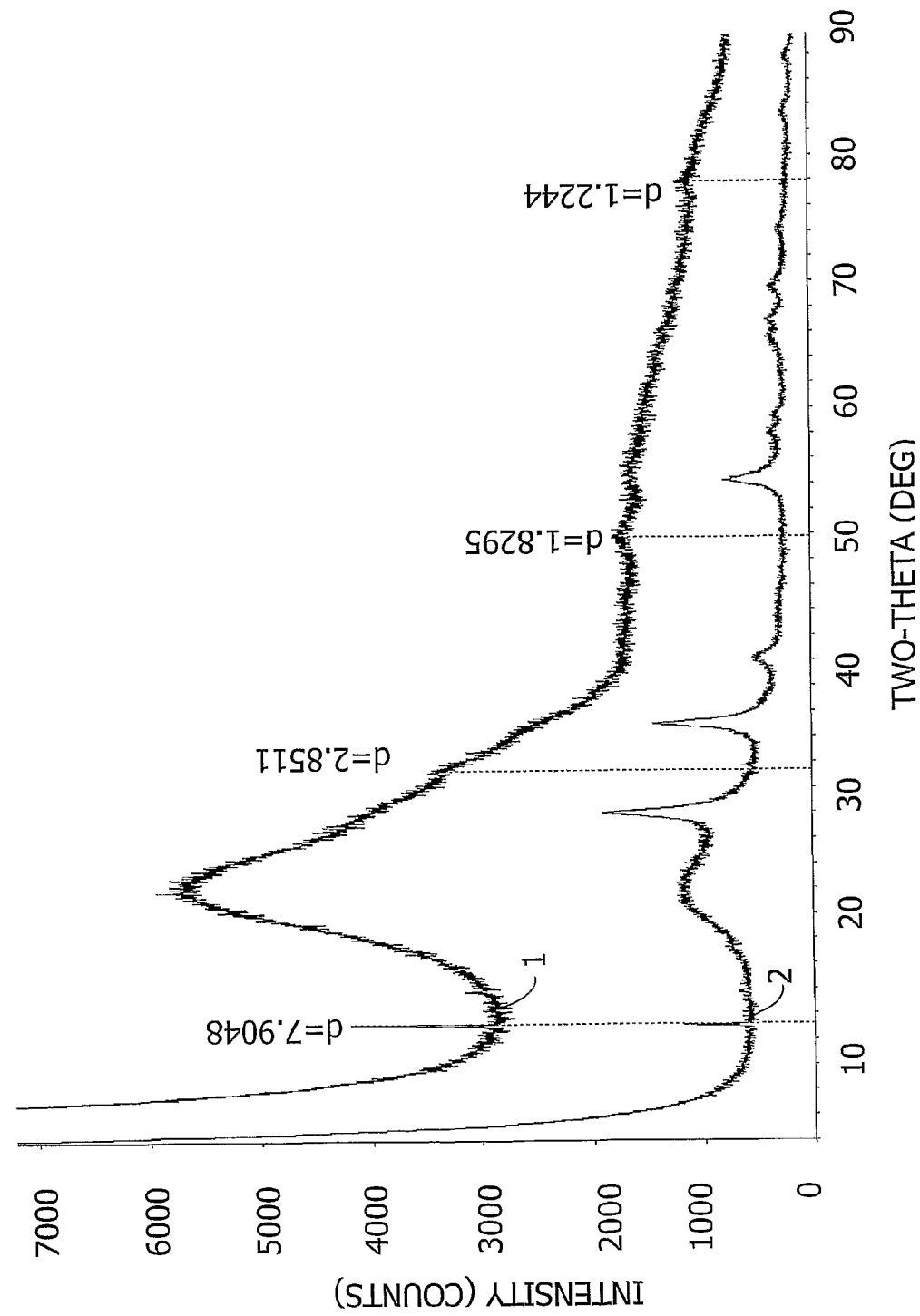
FIG. 4 shows x-ray diffraction patterns for the catalysts prepared in Example 15 wherein the upper tracing represents powdered samples of ruthenium oxide-50 nm $ZrO_2$/100 nm $ZrO_2$/silica granules (labeled reference 1) and the lower tracing represents powdered samples of ruthenium oxide/silica granules (labeled reference 2).

Powder X-ray diffraction data on catalysts 11 and 12 are recorded by the patterns in FIG. 4. The lower tracing (reference 2) represents catalyst 11 (powdered samples of $RuO_2$/silica granules) and corresponds to the powder pattern for $RuO_2$ having a crystallite dimension of about 100 Å. The upper tracing (reference 1) represents catalyst 12 (powdered samples of $RuO_2$-50 nm $ZrO_2$/100 nm $ZrO_2$/silica granules) and is interpreted as amorphous phases that do not correspond to phases for either $RuO_2$ or $ZrO_2$.

Example 17

An aqueous 15 weight percent Sylox 15 slurry was prepared and analyzed for particle size distribution using a Beckman Coulter LS particle size analyzer. The results indicate a mean particle size of 21.2 microns with 90% of the particles below 32 microns and 50% of the particles below 10 microns. Viscosity was measured at about 24° C. and found to be about 75 centipoise.

The Sylox 15 slurry was passed through a MICROFLUIDIZER high shear, high pressure fluid processor apparatus supplied by Microfluidics Corporation (Newton, Mass., USA) under high pressure. The results indicate a mean particle size of 11.3 microns with 90% of the particles below 24 microns and 50% of the particles below 9 microns. Viscosity was measured at about 24° C. and found to be about 5 centipoise.

Colloidal silicas commercially available from W. R. Grace and Company (Ludox® TMA and A-30) were analyzed for particle size using transmission electron microscopy (TEM). Statistical image analysis of samples taken from a number of lots AS-30 colloidal silica gave an average particle size of 12-14 nm and a standard deviation of 3-4 nm. Statistical image analysis of samples taken from a number of lots TMA colloidal silica gave an average particle size of 22-24 nm and a standard deviation of 5-6 nm.

Example 18

Alternative ruthenium oxide precursor compounds were evaluated for use in the preparation of supported catalysts. For the catalyst support, granules of between 2.1 to 2.4 μm particle size (granules de-dusted on a #20 mesh sieve screen after passing through a #10 mesh sieve screen) of DAVICAT SIZR 4700 (surface-coated zirconia on silica having about 1 to 2% by weight Zr by XRF analysis and a BET surface area in excess of 200 $m^2$/g obtained from W. R. Grace) were selected. An aqueous stock solution containing $Ru_3O$ $(O_2CCH_3)_6(H_2O)_3(CH_3CO_2)$ (obtained from Colonial Metals, Elkton, Md., product number 8062, 38.6% Ru assay) was prepared containing 0.21 M ruthenium, 145 g 1 M sulfuric acid and 0.5 mL of Triton CF-32 (obtained from Sigma Aldrich). The stock solution was diluted by a factor of four to make a 0.052 M ruthenium solution. This diluted solution was used to soak 15.515 g (about 30 $cm^3$) of DAVICAT SIZR 4700 granules under a house vacuum for 13 minutes. The soaked glossy black granules were recovered on a #20 mesh screen. The granules were dried in a forced air oven at 90° C. for 17 hours producing glistening black granules. The granules were then dried further for 2-hour intervals at 110° C. and 140° C.

The dried granules, comprising the supported $Ru_3O$ $(O_2CCH_3)_6(H_2O)_3^+$ complex, were then loaded into a stainless steel pipe cell (2.5 cm diameter by 20.3 cm long) between calcined glass wool plugs containing both inlet and outlet ports for gas treatment. Air was humidified by passing it at 2.6 SLPM through a 73° C. water reservoir upstream of the pipe cell. The pipe cell containing the granules was placed in a furnace and heated to 205° C. and the humid air stream was then passed over the granules in a 2.5-hour treatment period during which 108 g of water were converted to steam. The initial 15.249 g of granules were recovered and weighed showing a final weight of 14.689 g of granules. The recovered granules were designated catalyst 14. XRF analysis of these activated catalyst granules gave 0.80% by weight Ru and 0.95% by weight Zr.

A sample cored from one of the monolith catalysts prepared in Example 12 using ruthenium trichloride hydrate as the ruthenium oxide precursor salt was designated catalyst 15. The cored monolith was 1.56 cm in diameter and 2.49 cm long and weighed 1.93 g. XRF analysis of this catalyst gave 1.62% by weight Ru and 0.31% by weight Zr. A portion of 1.079 g of activated catalyst 14 granules and the cored monolith of catalyst 15 weighing 1.93 g were charged to two reactors of the TCAT reactor system. More severe conditions were used for the gas stream (about 1% $SO_2$ and 7% $O_2$) and the catalysts were aged at 425° C. for 20.7 hours. The results of the temperature-dependent conversions of these catalysts before (14 and 15) and after (14A and 15A) aging are shown in Table 9.

TABLE 9

| Catalyst | | Catalyst | |
|---|---|---|---|
| 14 | 14A | | 15 | 15A |
| 7% $O_2$ at Temperature, ° C. | %-$SO_2$ Conversion of 0.99% $SO_2$ | 7% $O_2$ at Temperature, ° C. | %-$SO_2$ Conversion of 0.96% $SO_2$ |

| 7% $O_2$ at Temp, °C | 14 | 14A | 7% $O_2$ at Temp, °C | 15 | 15A |
|---|---|---|---|---|---|
| 251 | 1.28 | 0.87 | 252 | 2.15 | 2.32 |
| 275 | 1.72 | 2.33 | 276 | 5.00 | 4.69 |
| 299 | 4.85 | 4.51 | 301 | 11.59 | 8.94 |
| 323 | 10.39 | 10.48 | 325 | 24.21 | 18.55 |
| 349 | 20.94 | 22.20 | 350 | 47.63 | 37.07 |
| 373 | 41.42 | 42.46 | 376 | 74.13 | 61.73 |

Comparison of the relative turnover rates of catalysts 14 and 15 at about 375° C. shows that the lower Ru-loaded catalyst 14 granules provide 0.220 moles-$SO_2$-converted/minute-mole-Ru whereas the cored monolith catalyst 15 provides 0.094 moles-$SO_2$-converted/minute-mole-Ru.

Example 19

In order to account for variations in turnover rates for catalysts 14 and 15 in Example 18, a microscopy study was performed on samples representative of catalysts 14 and 15. In the case of catalysts 14, the identical pieces used in the TCAT study reported in Table 9 were available for electron microscopy examination. In the case of catalyst 15, a catalyst that was representative of the monolith catalyst prepared in Example 12, referenced as catalyst 15', was submitted for electron microscopy investigation.

Figure 5:
FIG. 5 represents a scanning transmission electron micrograph (STEM) image of a sample obtained from cut pieces of a monolith catalyst (catalyst 15') representative of the monolith catalyst prepared in Example 12.
Figure 6:
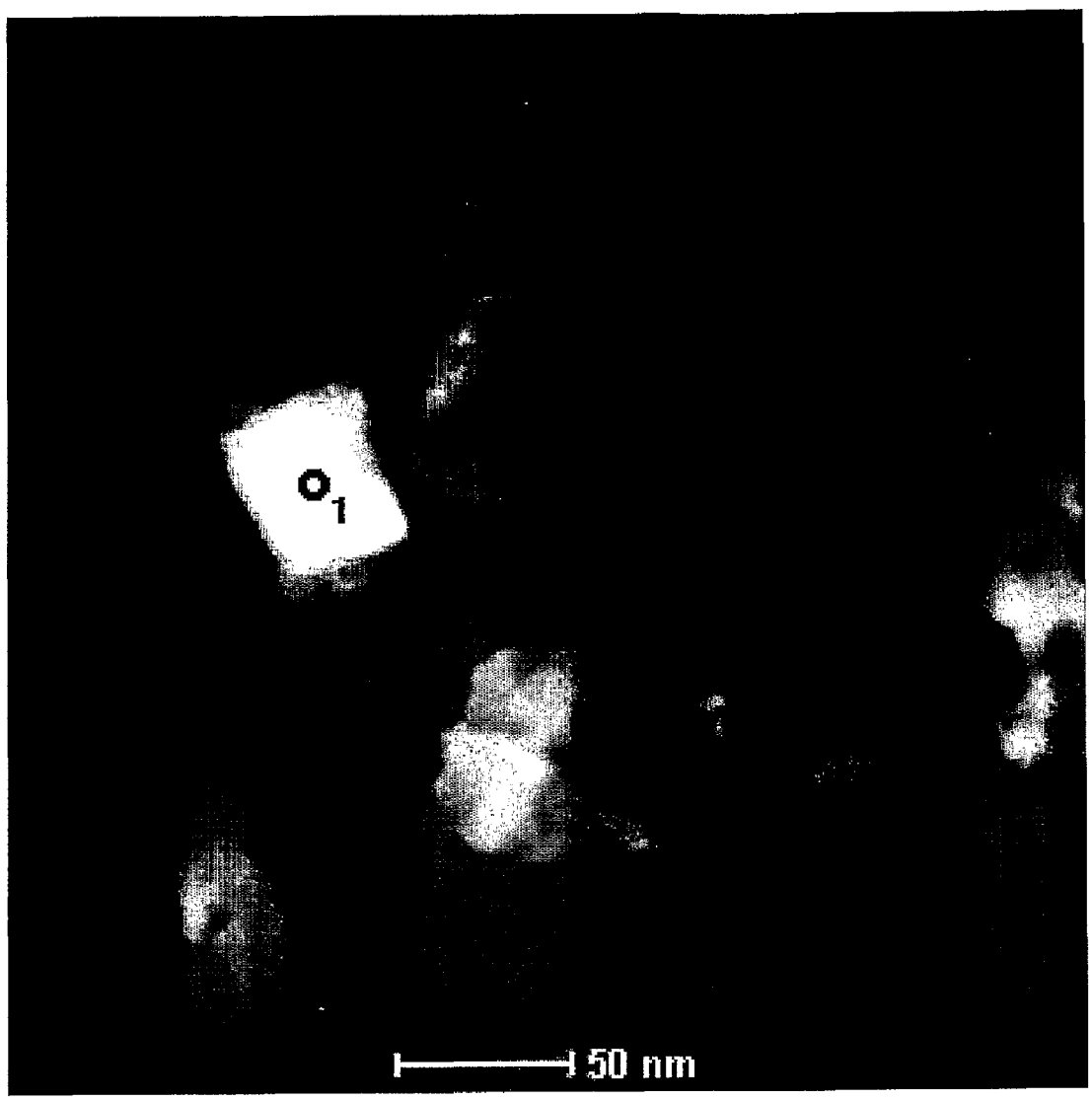
FIG. 6 shows use of the energy dispersive X-ray spectroscopy (EDS) for compositional analysis of one of the bright areas in FIG. 5 with the beam location given by the circled region (labeled reference 1). The elemental analysis of this region is given in FIG. 7.
Figure 7:
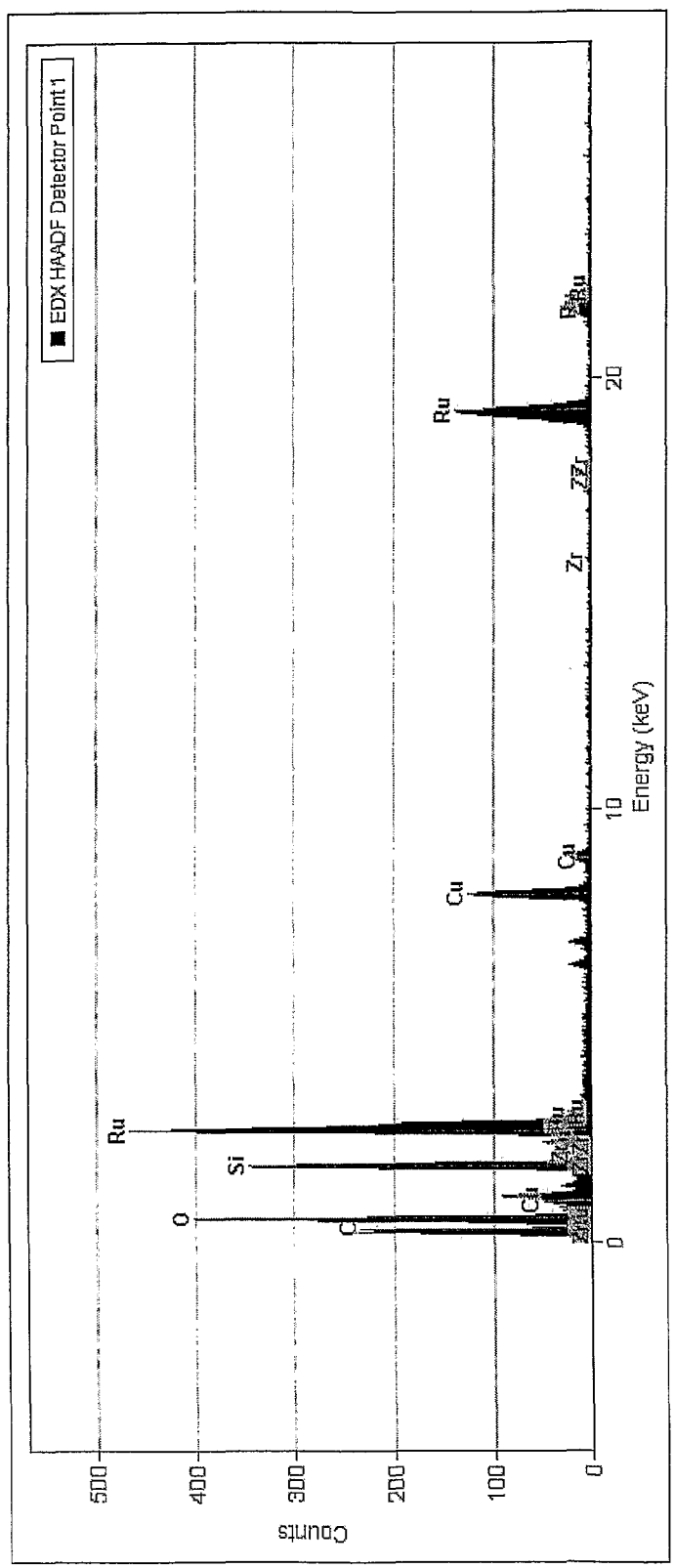
FIG. 7 presents the EDS output for the region labeled reference 1 in FIG. 6 obtained using an EDAX-TSL instrument.
Figure 8:
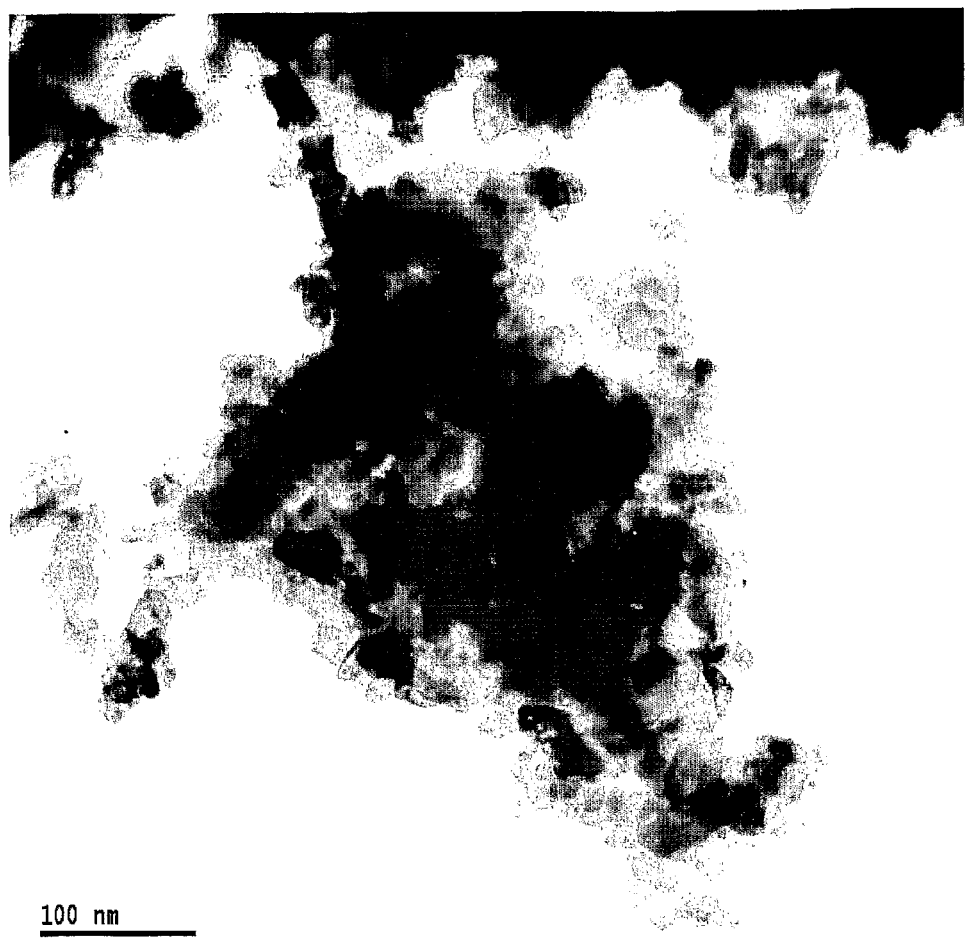
FIG. 8 depicts a transmission electron micrograph (TEM) survey of the ruthenium dioxide phase (dark contrast regions) supported on silica (light contrast regions) from a monolith catalyst (catalyst 15') representative of the monolith catalyst prepared in Example 12.
Figure 9:
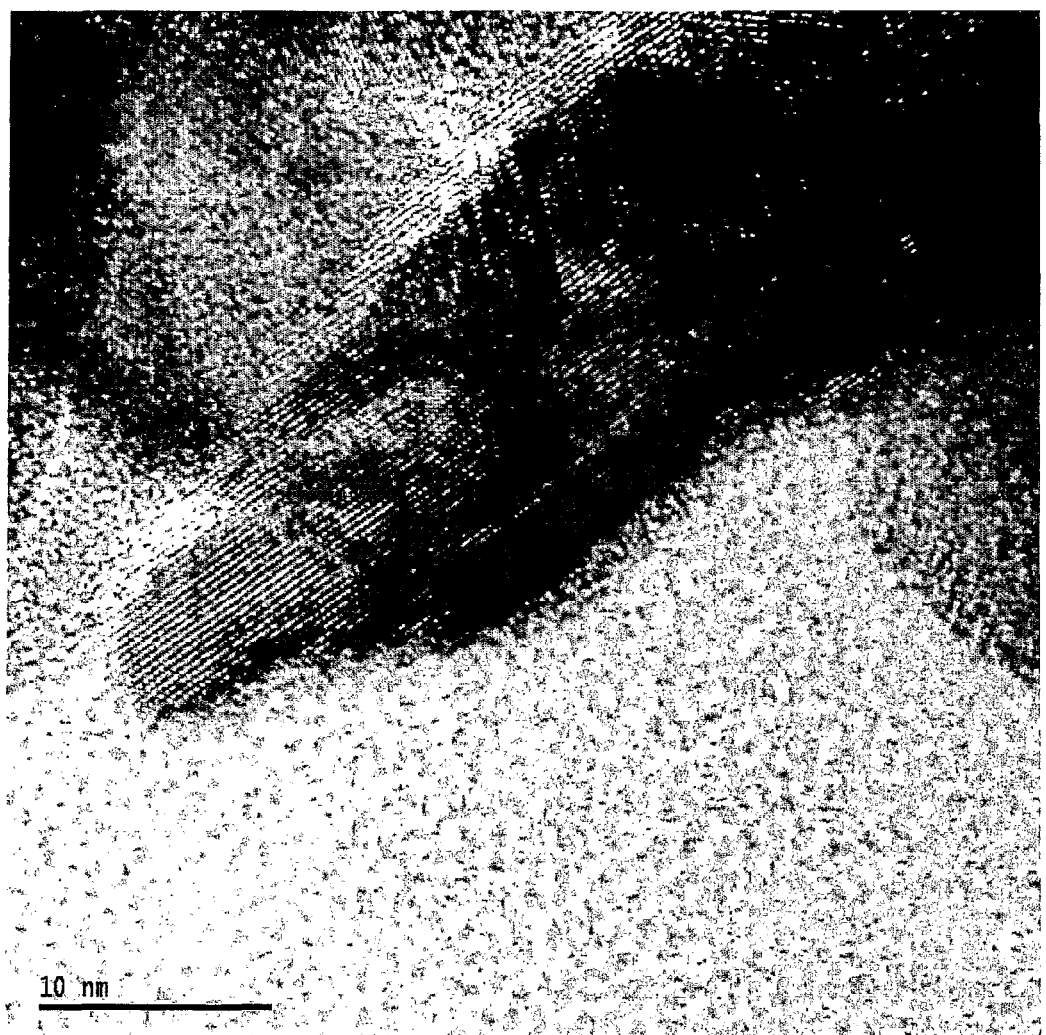
FIG. 9 increases magnification of the TEM image in FIG. 8.

Catalyst 15' was analyzed by scanning transmission electron microscopy (STEM) and energy dispersive X-ray spectroscopy (EDS) in order to survey areas of the catalyst containing supported ruthenium dioxide. The STEM images of monolith catalyst 15' in FIGS. 5 and 6 reveal relatively large regions of ruthenium dioxide supported on silica. The bright areas are the ruthenium dioxide phase supported on silica particles. EDS elemental analysis of one of the bright areas in FIG. 5 with the beam location given by the circled region (labeled reference 1) in FIG. 6 is shown in FIG. 7. The data suggest that the ruthenium dioxide phase is supported directly on silica. The zirconia phase is present in low levels suggesting that its interaction with the ruthenium dioxide occurs in an interfacial region but does not support the ruthenium dioxide. The images of monolith catalyst 15' in FIGS. 8 and 9 depict a transmission electron micrograph (TEM) survey of the ruthenium dioxide phase (dark contrast regions) supported on silica (light contrast regions). Analysis of typical images such as that shown in FIG. 9 allows estimation of the range of ruthenium dioxide phase crystallite sizes. The ruthenium dioxide phase appears in these images as relatively large elongated crystallites of $RuO_2$ ranging in size from 200 Å to 1000 Å (20 nm to 100 nm).

Figure 10:
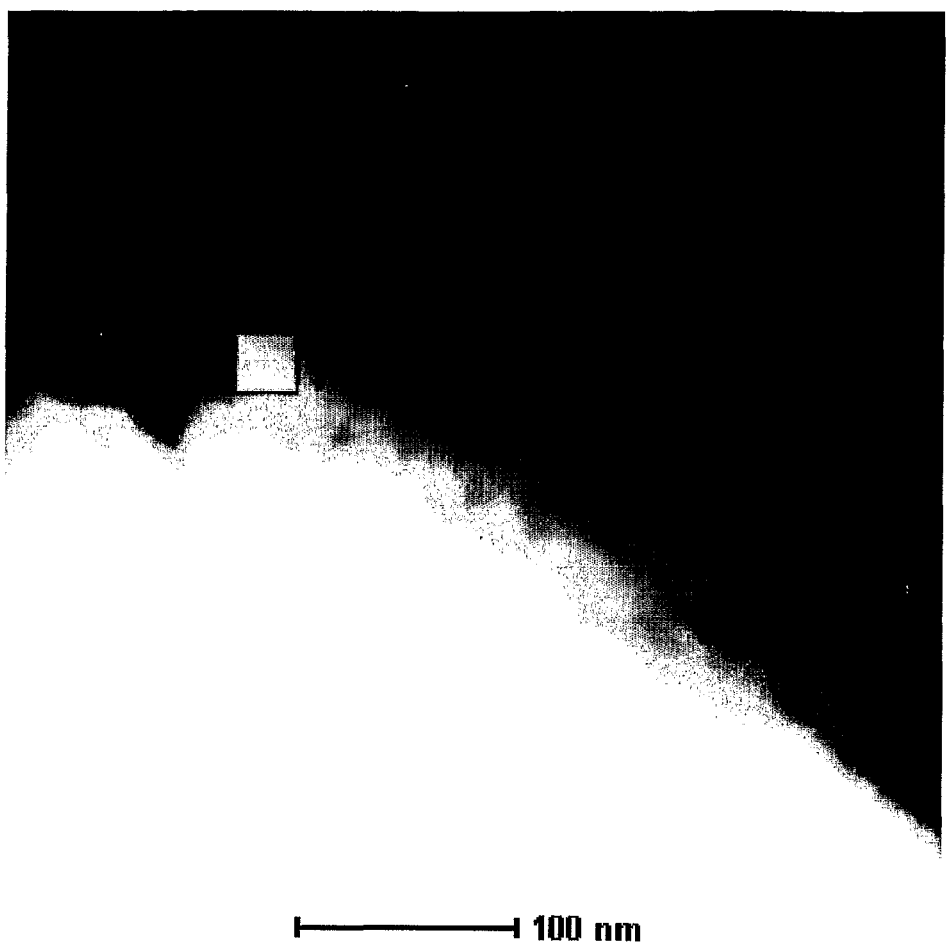
FIG. 10 presents a STEM image of the granular supported ruthenium oxide catalyst (catalyst 14) prepared in Example 18 (after TCAT reactor testing) with the squared region (labeled reference 1) showing the beam location for EDS compositional analysis of this region. The elemental analysis of this region is given in FIG. 11.
Figure 11:
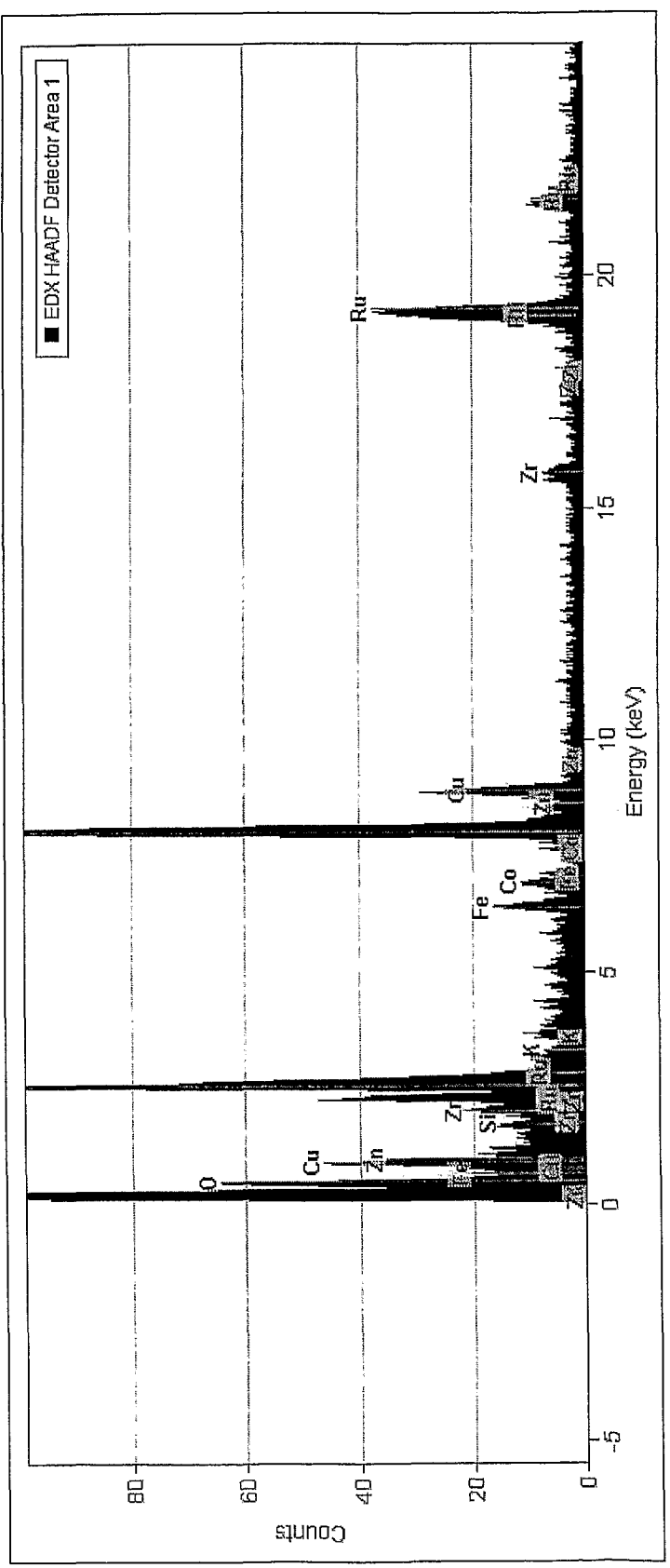
FIG. 11 presents the EDS output for the region labeled reference 1 in FIG. 10 obtained using an EDAX-TSL instrument.
Figure 12:
FIG. 12 provides a representative high-resolution TEM image of the granular supported ruthenium oxide catalyst (catalyst 14) prepared in Example 18 (after TCAT reactor testing).

FIG. 10 presents a STEM image of the granular supported ruthenium oxide catalyst 14 prepared in Example 18 (after TCAT reactor testing). EDS elemental analysis for the squared region (labeled reference 1) in from FIG. 10 obtained using an EDAX-TSL instrument is shown in FIG. 11. Based on the microscopy analysis, catalyst 14 appears to comprise well-dispersed crystallites of $RuO_2$ supported on silica. There was no direct evidence for support on the $ZrO_2$ phase present. The STEM image in FIG. 10 shows the entire surface covered with small $RuO_2$ crystallites. The EDS elemental analysis presented in FIG. 11 shows about 3% by weight Zr indicative of the surface enrichment of the surface phase, while the bulk phase amount is closer to 1 to 2%. The data suggest that the ruthenium dioxide phase is supported mostly on silica. The zirconia phase is present in low levels (3% by weight Zr) suggesting that its interaction with the ruthenium dioxide occurs in an interfacial region. Further analysis of the surface of catalyst 14 (FIG. 11) reveals about 7 to 12% by weight sulfur present apparently as surface sulfate species. XRF analysis of catalyst 14 analyzed showed that it contained 0.95% by weight Zr. FIG. 12 provides a representative high-resolution TEM image of catalyst 14 prepared in Example 18 (after TCAT reactor testing). Analysis of several of these high-resolution TEM images leads to the conclusion that the surface is covered with small, randomly oriented ruthenium dioxide crystallites of from 50 Å to 100 Å (5 nm to 10 nm) on the very porous surface.

Based on the data, it is believed that use of the $Ru_3O(O_2CCH_3)_6(H_2O)_3^+$ catalyst precursor complex for catalyst 14 leads not only to smaller crystallites than a $RuO_2$ catalyst derived from $RuCl_3*xH_2O$ (catalysts 15 and 15'), but a catalyst with improved activity and stability obtained through direct air-steam activation.

The present invention is not limited to the above embodiments and can be variously modified. The above description of the preferred embodiments, including the Examples, is intended only to acquaint others skilled in the art with the invention, its principles, and its practical application so that others skilled in the art may adapt and apply the invention in its numerous forms, as may be best suited to the requirements of a particular use.

With reference to the use of the word(s) comprise or comprises or comprising in this entire specification (including the claims below), unless the context requires otherwise, those words are used on the basis and clear understanding that they are to be interpreted inclusively, rather than exclusively, and that each of those words is to be so interpreted in construing this entire specification.

What is claimed is:

1. A process for the catalytic oxidation of sulfur dioxide to sulfur trioxide, the process comprising contacting a feed gas mixture comprising sulfur dioxide and oxygen with an oxidation catalyst comprising an active phase comprising ruthenium oxide thereby producing a conversion gas comprising sulfur trioxide, wherein the temperature of the gas in contact with the ruthenium oxide oxidation catalyst is no greater than about 400° C.

2. The process as set forth in claim 1 wherein the oxidation catalyst comprises an acid-resistant support having the active phase thereon.

3. The process as set forth in claim 2 wherein the acid-resistant support is in the form of a powder, pellet, ring, sphere or foraminous monolith.

4. The process as set forth in claim 2 wherein the acid-resistant support is in the form of a foraminous monolith.

5. The process as set forth in claim 2 wherein the active phase comprises ruthenium oxide having an average crystallite size of less than about 150 Å.

6. The process as set forth in claim 5 wherein the active phase comprises ruthenium oxide crystallites ranging in size from about 30 Å to about 100 Å.

7. The process as set forth in claim 6 wherein the active phase comprises ruthenium oxide crystallites ranging in size from about 50 Å to about 80 Å.

8. The process as set forth in claim 2 wherein the ruthenium oxide active phase comprises ruthenium oxide and a promoter comprising a further metal oxide having a metal oxidation state of +4 or +3.

9. The process as set forth in claim 2 wherein the sulfur dioxide content of the feed gas mixture is no greater than about 2% by volume.

10. The process as set forth in claim 9 wherein the temperature of the gas in contact with the oxidation catalyst is from about 325° C. to about 400° C.

11. The process as set forth in claim 10 wherein the temperature of the gas in contact with the oxidation catalyst is from about 350° C. to about 375° C.

12. The process as set forth in claim 9 wherein the process is essentially adiabatic and the heat and sulfur dioxide content of the feed gas mixture are such that the exothermic heat of oxidation of sulfur dioxide to sulfur trioxide does not increase the temperature of the gas in contact with the oxidation catalyst above about 400° C.

13. The process as set forth in claim 12 wherein the sulfur dioxide content of the feed gas mixture is no greater than about 1% by volume.

14. The process as set forth in claim 13 wherein the average conversion of sulfur dioxide to sulfur trioxide is at least about 90%.

15. The process as set forth in claim 14 wherein the sulfur dioxide content of the conversion gas is less than about 50 ppmv.

16. A process for making sulfuric acid and/or oleum from a source gas comprising sulfur dioxide, the process comprising:
   forming a converter feed gas mixture by combining the source gas with an oxygen source;
   introducing the converter feed gas mixture into a catalytic converter comprising a plurality of catalyst stages in series, each catalyst stage containing an oxidation catalyst effective for oxidizing sulfur dioxide to sulfur trioxide, thereby contacting the converter feed gas mixture with the oxidation catalyst contained in at least the first catalyst stage in said series to form a partial conversion gas comprising sulfur trioxide and residual sulfur dioxide and oxygen;
   passing the partial conversion gas through at least one further catalyst stage in said series, the oxidation catalyst contained therein comprising an active phase comprising ruthenium oxide, thereby oxidizing residual sulfur dioxide in the partial conversion gas to sulfur trioxide and forming a conversion gas comprising sulfur trioxide and residual sulfur dioxide; and
   contacting the conversion gas with an aqueous solution comprising sulfuric acid for absorption of sulfur trioxide therefrom in a sulfur trioxide absorption zone to produce additional sulfuric acid and/or oleum and a sulfur trioxide-depleted gas comprising sulfur dioxide.

17. The process as set forth in claim 16 wherein the ruthenium oxide oxidation catalyst comprises an acid-resistant support having the active phase thereon.

18. The process as set forth in claim 17 wherein the acid-resistant support is in the form of a powder, pellet, ring, sphere, or foraminous monolith.

19. The process as set forth in claim 17 wherein the acid-resistant support is in the form of a foraminous monolith.

20. The process as set forth in claim 17 wherein the active phase comprises ruthenium oxide having an average crystallite size of less than about 150 Å.

21. The process as set forth in claim 20 wherein the active phase comprises ruthenium oxide crystallites ranging in size from about 30 Å to about 100 Å.

22. The process as set forth in claim 21 wherein the active phase comprises ruthenium oxide crystallites ranging in size from about 50 Å to about 80 Å.

23. The process as set forth in claim 17 wherein the active phase comprises ruthenium oxide and a promoter comprising a further metal oxide having a metal oxidation state of +4 or +3.

24. The process as set forth in claim 17 wherein the sulfur dioxide content of the partial conversion gas is no greater than about 2% by volume and the temperature of the gas in contact with the ruthenium oxide oxidation catalyst is no greater than about 400° C.

25. The process as set forth in claim 24 wherein the temperature of the gas in contact with the ruthenium oxide oxidation catalyst is from about 325° C. to about 400° C.

26. The process as set forth in claim 25 wherein the temperature of the gas in contact with the ruthenium oxide oxidation catalyst is from about 350° C. to about 375° C.

27. The process as set forth in claim 24 wherein the oxidation of sulfur dioxide to sulfur trioxide in the partial conversion gas is essentially adiabatic and the heat and sulfur dioxide content of the partial conversion gas contacting the ruthenium oxide oxidation catalyst are such that the exothermic heat of oxidation of sulfur dioxide to sulfur trioxide does not increase the temperature of the gas in contact with the ruthenium oxide oxidation catalyst above about 400° C.

28. The process as set forth in claim 27 wherein the sulfur dioxide content of the partial conversion gas is no greater than about 1% by volume.

29. The process as set forth in claim 28 wherein the average conversion of sulfur dioxide to sulfur trioxide in the partial conversion gas is at least about 90%.

30. The process as set forth in claim 29 wherein the sulfur dioxide content of the conversion gas is less than about 50 ppmv.

31. The process as set forth in claim 24 wherein before contacting the ruthenium oxide oxidation catalyst, the partial conversion gas is contacted with an aqueous solution comprising sulfuric acid for absorption of sulfur trioxide therefrom in a sulfur trioxide absorption zone to produce additional sulfuric acid and/or oleum and a partial conversion gas depleted in sulfur trioxide content.

32. The process as set forth in claim 31 wherein said partial conversion gas is formed by passing said converter feed gas mixture through at least the first two catalyst stages in said series of catalyst stages.

33. The process as set forth in claim 32 wherein said partial conversion gas is formed by passing said converter feed gas mixture through at least the first three catalyst stages in said series of catalyst stages.

34. The process as set forth in claim 31 wherein the ruthenium oxide oxidation catalyst is contained within the last catalyst stage in said series of catalyst stages.

35. A process for the preparation of an oxidation catalyst, the process comprising:

combining a ruthenium salt solution and an acid-resistant support to form a slurry;

adding a base to the slurry to form a catalyst precursor comprising a ruthenium oxide coating on the surface of the support; and heat treating the catalyst precursor at a first temperature of from about 200° C. to about 350° C. for from about 0.1 hour to about 5 hours, and at a second temperature from about 50° C. to about 500° C. for from abut 0.1 hour to about 5 hours to convert the catalyst precursor to the oxidation catalyst comprising the support and an active phase thereon comprising ruthenium oxide.

36. The process as set forth in claim 35 wherein the active phase comprises ruthenium oxide having an average crystallite size less than about 150 Å.

37. The process as set forth in claim 35 wherein the base is ammonium hydroxide.

38. The process as set forth in claim 35 wherein the ruthenium salt is ruthenium chloride hydrate, ruthenium nitrosyl nitrate hydrate, or ruthenium nitrate hydrate.

* * * * *